United States Patent
Kotani

(10) Patent No.: US 10,768,884 B2
(45) Date of Patent: Sep. 8, 2020

(54) COMMUNICATION APPARATUS, DISPLAY APPARATUS, CONTROL METHOD THEREOF, STORAGE MEDIUM, AND DISPLAY SYSTEM FOR CONFIGURING MULTI-DISPLAY SETTINGS

(71) Applicant: CANON KABUSHIKI KAISHA, Tokyo (JP)

(72) Inventor: Junji Kotani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/192,906

(22) Filed: Nov. 16, 2018

(65) Prior Publication Data
US 2019/0155563 A1    May 23, 2019

(30) Foreign Application Priority Data

Nov. 22, 2017  (JP) .................................. 2017-224854

(51) Int. Cl.
*G06F 3/14* (2006.01)
*H04W 4/80* (2018.01)
(Continued)

(52) U.S. Cl.
CPC ......... *G06F 3/1446* (2013.01); *H04N 9/3147* (2013.01); *H04N 9/3185* (2013.01); *H04N 21/4122* (2013.01); *H04W 4/80* (2018.02)

(58) Field of Classification Search
CPC ............. H04N 9/3147; H04N 21/4854; G09G 2356/00; G09G 2320/0626
See application file for complete search history.

(56) References Cited

U.S. PATENT DOCUMENTS 8,941,677 B1 * 1/2015 Hallenbeck ............. G06T 11/00
                                                  345/502
9,372,657 B2    6/2016 Ueda et al.
(Continued)

FOREIGN PATENT DOCUMENTS

JP    2000-330536 A    11/2000
JP    2003-271118 A     9/2003
(Continued)

OTHER PUBLICATIONS

The above foreign patent documents were cited in the Jun. 18, 2019 Japanese Office Action, which is enclosed without an English Translation, that issued in Japanese Patent Application No. 2017224854.

(Continued)

*Primary Examiner* — Paulos M Natnael
(74) *Attorney, Agent, or Firm* — Cowan, Liebowitz & Latman, P.C.

(57) ABSTRACT

A communication apparatus that is capable of communicating with one of a plurality of display apparatuses, so that an integrated image screen is constituted by combining display image screens of the plurality of display apparatuses, comprises at least one processor or circuit to perform the operations of the following units: a detection unit configured to detect, among the plurality of display apparatuses, a display apparatus that is close to the communication apparatus within a predetermined range to establish near field wireless communication; and a display unit configured to display information relating to, of the plurality of display apparatuses, a first display apparatus to which the communication apparatus is to be brought close so that the first display apparatus is detected by that detection unit.

13 Claims, 17 Drawing Sheets

(51) Int. Cl.
*H04N 9/31* (2006.01)
*H04N 21/41* (2011.01)

(56) References Cited

U.S. PATENT DOCUMENTS

| | | | | |
|---|---|---|---|---|
| 10,148,922 B2* | 12/2018 | Fujioka | ............... | H04N 9/3179 |
| 10,261,404 B2* | 4/2019 | Okano | ................ | G03B 21/28 |
| 2005/0157218 A1* | 7/2005 | Honma | .................. | H04L 29/06 |
| | | | | 348/744 |
| 2012/0268372 A1* | 10/2012 | Park | ...................... | G06F 3/017 |
| | | | | 345/158 |
| 2013/0235085 A1* | 9/2013 | Kim | ...................... | G06F 3/1454 |
| | | | | 345/660 |
| 2014/0009422 A1* | 1/2014 | Arigaya | ................ | G09G 5/006 |
| | | | | 345/173 |
| 2014/0347497 A1* | 11/2014 | Fukuchi | ............... | H04N 9/3147 |
| | | | | 348/180 |
| 2014/0375832 A1* | 12/2014 | Imaizumi | ................ | A63F 13/10 |
| | | | | 348/211.2 |
| 2015/0244998 A1* | 8/2015 | Yanazume | ........... | H04N 9/3185 |
| | | | | 348/38 |
| 2016/0260414 A1* | 9/2016 | Yang | ..................... | G06F 3/0481 |
| 2016/0291919 A1* | 10/2016 | Kurota | .................. | G06F 3/1446 |
| 2017/0212719 A1* | 7/2017 | Fujimori | ............... | G06F 3/1454 |
| 2017/0357426 A1* | 12/2017 | Wilson | .................. | G06F 3/0482 |
| 2018/0359343 A1* | 12/2018 | Lee | ...................... | H04B 1/3888 |
| 2019/0095077 A1* | 3/2019 | Mori | ................... | G06F 3/04817 |
| 2019/0149783 A1* | 5/2019 | Kotani | .................. | G03B 37/04 |
| | | | | 353/94 |

FOREIGN PATENT DOCUMENTS

| | | |
|---|---|---|
| JP | 2004-219869 A | 8/2004 |
| JP | 2012-088636 A | 5/2012 |
| JP | 2014-228617 A | 12/2014 |
| JP | 2016-085435 A | 5/2016 |
| JP | 2016-197146 A | 11/2016 |
| JP | 2016-213662 A | 12/2016 |
| JP | 2016-225823 A | 12/2016 |
| JP | 2017-016314 A | 1/2017 |
| WO | 2013/186835 A1 | 12/2013 |
| WO | 2014/115298 A1 | 7/2014 |

OTHER PUBLICATIONS

The above foreign patent documents were cited in the Jan. 24, 2020 Japanese Office Action, which is enclosed without an English Translation, that issued in Japanese Patent Application No. 2017224854.

* cited by examiner

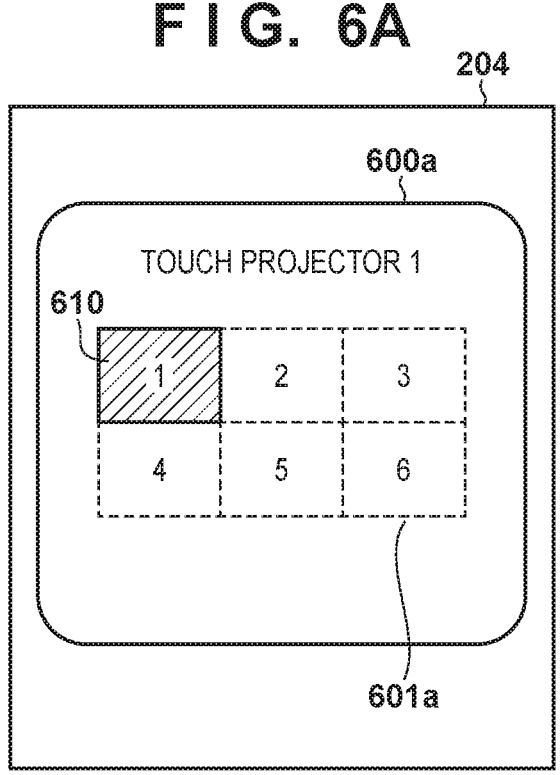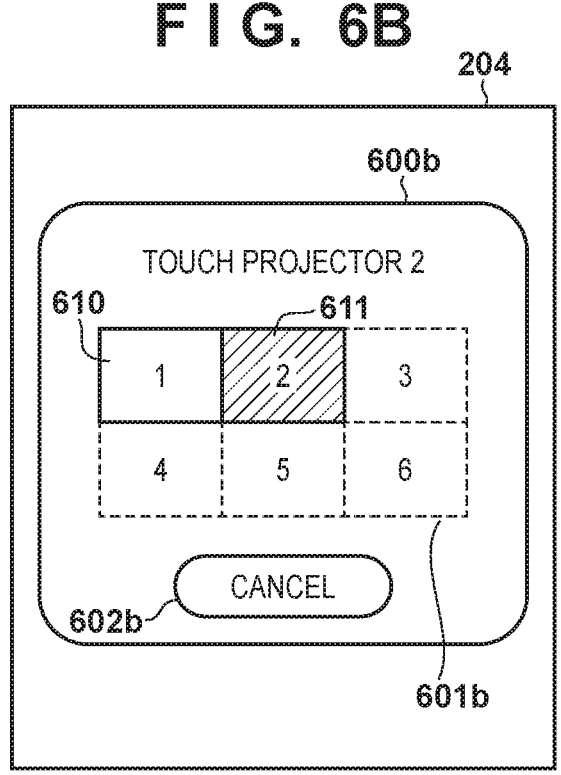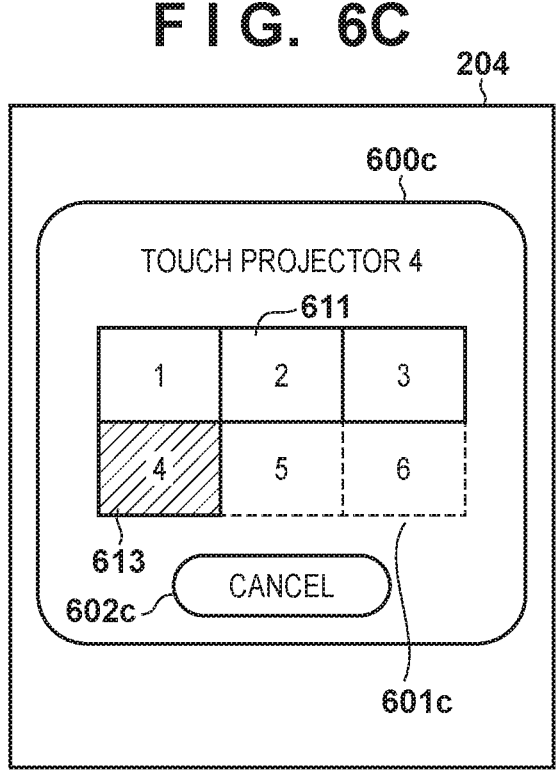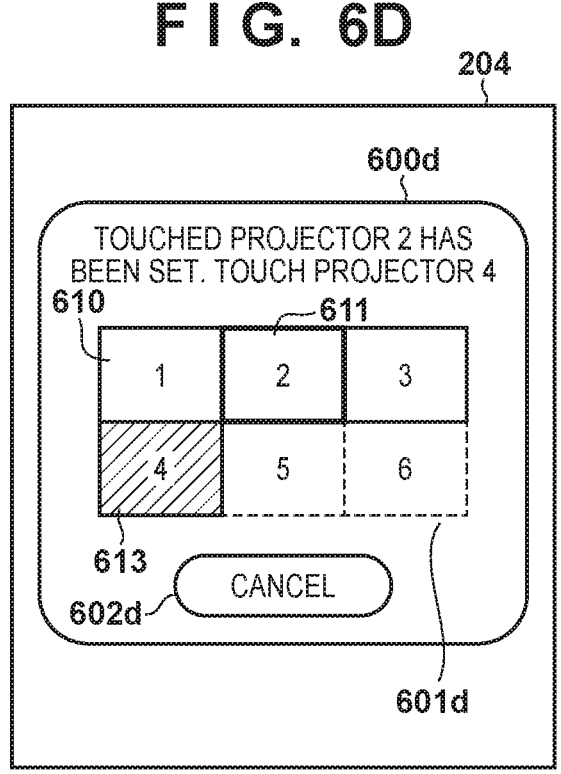

COMMUNICATION APPARATUS, DISPLAY APPARATUS, CONTROL METHOD THEREOF, STORAGE MEDIUM, AND DISPLAY SYSTEM FOR CONFIGURING MULTI-DISPLAY SETTINGS

BACKGROUND OF THE INVENTION

Field of the Invention

The present invention relates to a communication apparatus, a display apparatus, control methods thereof, a storage medium, and a display system, and particularly relates to a technique for configuring multi-display settings using a communication apparatus.

Description of the Related Art

Recently, systems are known that uses a plurality of display apparatuses, so that a plurality of display screens are laid out to realize "multi display" configuring a single large screen. Such systems include a system that uses, as display apparatuses, projection apparatuses, which form an image on a light bulb such as a liquid crystal panel, enlarge the formed image, and optically project and display the enlarged image onto a screen or the like, and this system is commonly referred to as "multi projection".

In multi projection, each projection apparatus needs to recognize a layout of a plurality of display image screens (for example, 3 display image screens horizontally×2 display image screens vertically) and the position (for example, upper left) in the layout that is associated with this projector, and specify its display area in one or more input image signals. To achieve such tasks, Japanese Patent Laid-Open No. 2016-197146 discloses a technique in which a master projector of a system sets, in accordance with user operations, a layout (S303) and IP addresses of projectors respectively associated with positions in the layout (S304). Furthermore, Japanese Patent Laid-Open No. 2014-228617 discloses a technique in which a projector specifies its own display area and the relative layout relationship to another projector, by transmitting, to the other projector, a command to instruct it to project a test image and capturing the test image projected by the other projector.

However, in Japanese Patent Laid-Open No. 2016-197146, a user is required to perform a complicated operation of inputting IP addresses and the like to an input screen (using an operation key or a remote controller), and thus an input error is likely to occur. Also, in Japanese Patent Laid-Open No. 2014-228617, there may be cases in which the projected image cannot be appropriately captured and the layout cannot be correctly recognized, due to adverse effects caused by the set-up environment of the projectors (for example, the distance between the projectors and a screen) or a projection optical system after replacement, for example.

SUMMARY OF THE INVENTION

The present invention has been made in consideration of the aforementioned problems, and realizes a technique that makes it possible to further reliably set display positions respectively associated with a plurality of display apparatuses.

In order to solve the aforementioned problems, one aspect of the present invention provides a communication apparatus that is capable of communicating with one of a plurality of display apparatuses, so that an integrated image screen is constituted by combining display image screens of the plurality of display apparatuses, comprising at least one processor or circuit to perform the operations of the following units: a detection unit configured to detect, among the plurality of display apparatuses, a display apparatus that is close to the communication apparatus within a predetermined range to establish near field wireless communication; and a display unit configured to display information relating to, of the plurality of display apparatuses, a first display apparatus to which the communication apparatus is to be brought close so that the first display apparatus is detected by that detection unit.

Another aspect of the present invention provides, a communication apparatus that is capable of communicating with one of a plurality of display apparatuses, so that an integrated image screen is constituted by combining display image screens of the plurality of display apparatuses, comprising at least one processor or circuit to perform the operations of the following units: a communication unit configured to communicate with, of the plurality of display apparatuses, a display apparatus that is close to the communication apparatus within a predetermined range through near field wireless communication; and a display unit configured to display information relating to, of the plurality of display apparatuses, a display apparatus to which the communication apparatus is to be brought close so that the near field wireless communication through the communication unit is established.

Still another aspect of the present invention provides, a display apparatus that is capable of displaying one of a plurality of display image screens in order to constitute an integrated image screen constituted by combining the plurality of display image screens, comprising at least one processor or circuit to perform the operations of the following units: a detection unit configured to detect a communication apparatus that is close to the display apparatus within a predetermined range to establish near field wireless communication; a receiving unit configured to receive, from the communication apparatus detected by the detection unit, position information of the display image screen of the display apparatus with respect to the integrated image screen; and a display unit configured to display the display image screen based on the position information.

Yet another aspect of the present invention provides, a control method of a communication apparatus that communicates with one of a plurality of display apparatuses, so that an integrated image screen is constituted by combining display image screens of the plurality of display apparatuses, the method comprising: detecting, among the plurality of display apparatuses, a display apparatus that is close to the communication apparatus within a predetermined range to establish near field wireless communication; and transmitting, to the detected display apparatus, position information of the display image screen of a predetermined display apparatus with respect to the integrated image screen.

Still yet another aspect of the present invention provides, a control method of a display apparatus that displays one of a plurality of display image screens in order to constitute an integrated image screen constituted by combining the plurality of display image screens, the method comprising: detecting a communication apparatus that is close to the display apparatus within a predetermined range to establish near field wireless communication; receiving, from the detected communication apparatus, position information of the display image screen of the display apparatus with respect to the integrated image screen; and displaying the display image screen based on the position information.

Yet still another aspect of the present invention provides, a display system including a plurality of display apparatuses, and a communication apparatus capable of communicating with one of the plurality of display apparatuses so that an integrated image screen is constituted by combining display image screens of the plurality of display apparatuses, the communication apparatus including at least one processor or circuit to perform the operations of the following units: a detection unit configured to detect, among the plurality of display apparatuses, a display apparatus that is close to the communication apparatus within a predetermined range to establish near field wireless communication; and a transmitting unit configured to transmit, to the display apparatus detected by the detection unit, position information of the display image screen of a predetermined display apparatus with respect to the integrated image screen, the plurality of display apparatuses each including at least one processor or circuit to perform the operations of the following units: a receiving unit configured to receive, from the communication apparatus that is close to this display apparatus within a predetermined range, position information of the display image screen of the display apparatus with respect to the integrated image screen; and a display unit configured to display the display image screen based on the position information.

Still yet another aspect of the present invention provides, a non-transitory computer-readable storage medium storing a program for causing a computer to execute a control method of a communication apparatus that communicates with one of a plurality of display apparatuses so that an integrated image screen is constituted by combining display image screens of the plurality of display apparatuses, the method comprising: detecting, among the plurality of display apparatuses, a display apparatus that is close to the communication apparatus within a predetermined range to establish near field wireless communication; and transmitting, to the detected display apparatus, position information of the display image screen of a predetermined display apparatus with respect to the integrated image screen.

Yet still another aspect of the present invention provides, a non-transitory computer-readable storage medium storing a program for causing a computer to execute a control method of a display apparatus that displays one of a plurality of display image screens in order to constitute an integrated image screen constituted by combining the plurality of display image screens, the method comprising: detecting a communication apparatus that is close to the display apparatus within a predetermined range to establish near field wireless communication; receiving, from the detected communication apparatus, position information of the display image screen of the display apparatus with respect to the integrated image screen; and displaying the display image screen based on the position information.

According to the present invention, it is possible to further reliably set display positions respectively associated with a plurality of display apparatuses.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A to 6K illustrate touch request screens according to the first embodiment.

DESCRIPTION OF THE EMBODIMENTS

First Embodiment

Hereinafter, an exemplary embodiment of the present invention will be described in detail with reference to the drawings. A multi-projection system according to the present embodiment includes projectors, which serve as exemplary projection apparatuses, and a smartphone, which serves as an exemplary communication apparatus. In the following description, a multi-projection system that includes six projectors and one smartphone will be taken as an example, but the present embodiment is applicable to any system as long as at least two projectors are included. Furthermore, the following will describe an example of the multi-projection system in which each of the projectors, which serve as the projection apparatuses, projects a projection image screen, but the present embodiment is also applicable to any display system in which each of display apparatuses with a flat panel using liquid crystal elements, organic EL elements, or the like displays a display image screen. Furthermore, the projection apparatuses according to the present embodiment are also applicable to another type of devices capable of performing projection. Examples of these devices include a digital camera, a game console, a tablet terminal, a medical device, and an on-board system device that are provided with a projection unit. Furthermore, the communication apparatus according to the present embodiment is not limited to the smartphone, and is also applicable to another device capable of communicating with the projection apparatuses the display apparatuses). Examples of this device include a digital camera, a game console, a tablet terminal, a watch-type or glasses-type wearable terminal, a medical device, and an on-board system device that have the near field wireless communication function.

Overall Configuration

Figure 1:
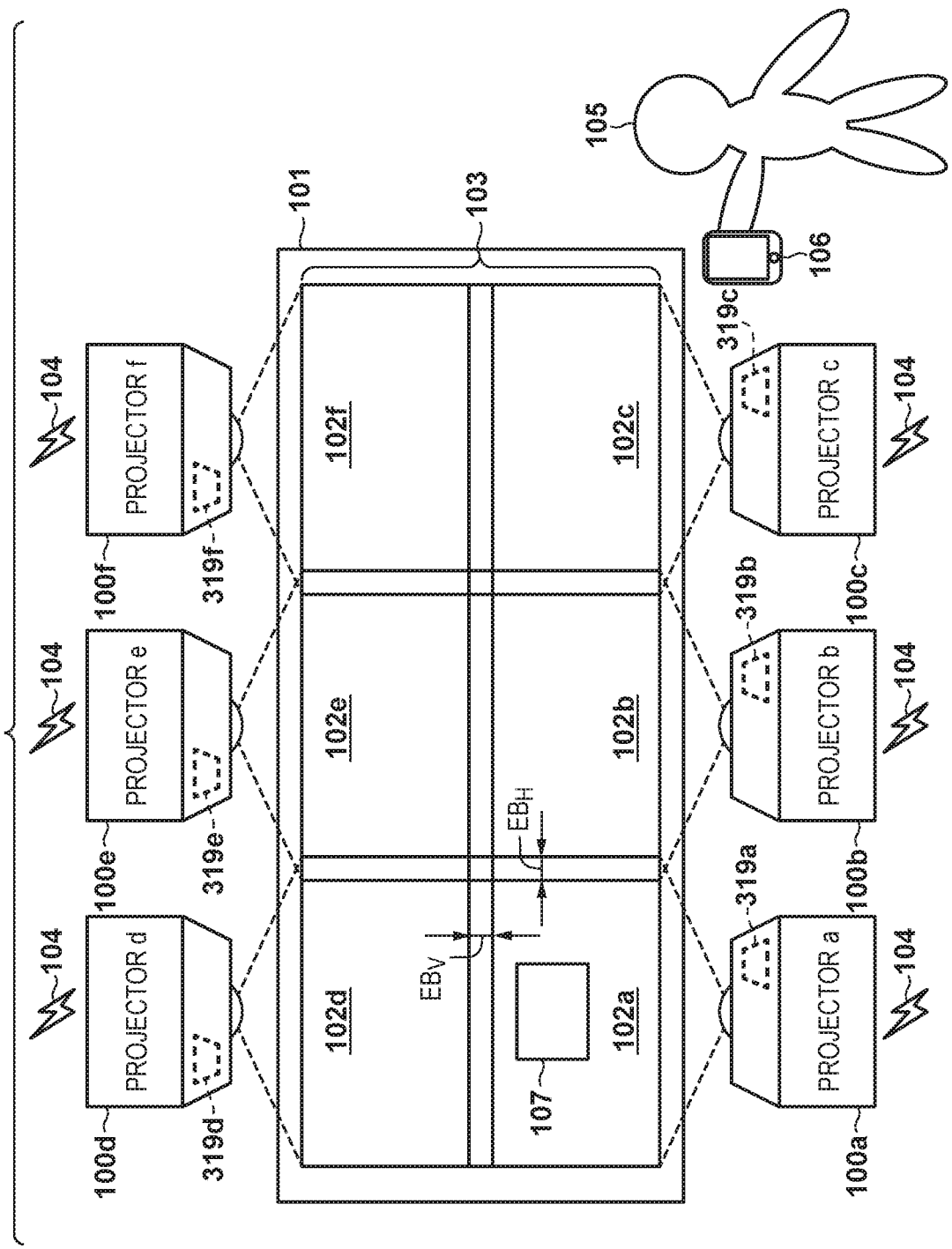
FIG. 1 is a diagram illustrating an overall configuration of a multi-projection system according to a first embodiment.

First, an overall configuration of the multi-projection system according to the present embodiment will be described with reference to FIG. 1. The multi-projection system according to the present embodiment uses, for example, six projectors to configure a large landscape image screen constituted by 3 image screens horizontally by 2 image screens vertically.

Reference numerals 100a to 100f denote projectors. The projectors 100a to 100f optically project image signals that were input respectively, and display projection image screens 102a to 102f on a screen 101. As a result of the projection image screens 102a to 102f respectively forming partial areas of an integrated image screen 103, one integrated content can be displayed. The projectors 100a to 100f are connected to a wireless LAN 104, and can communicate with each other. Furthermore, the projectors 100a to 100f acquire image data to be projected from a not-shown server or the like via the wireless LAN 104. Note that image data may be acquired through a method other than that using the wireless LAN 104, and respective pieces of image data may be acquired from, for example, a not-shown signal source via video cables. A user 105 holds a smartphone 106. The smartphone 106 will be described in detail later. The projectors 100a to 100f respectively include near field wireless communication units 319a to 319f. When the user 105 holds the smartphone 106 in front of a projector 100 or brings the smartphone 106 into contact with the projector 100, so that the smartphone 106 and the projector 100 are close to each other within a predetermined range, the smartphone 106 and the projector 100 can communicate with each other. Note that, for ease of description, actions such as "holding A in front of B" or "bringing A into contact with B" as described above are hereinafter referred to collectively as "touching B with A". The near field wireless communication units 319a to 319f will be described in detail later.

Here, in the multi-projection system, the projection image screens 102a to 102f are integrated into the integrated image screen 103 that appears to be one display image screen, and therefore it is necessary to configure settings of widths of overlapping areas and setting of display areas, for example. Accordingly, in the present embodiment, these settings are configured based on information transmitted from the smartphone 106 (details thereof will be described later).

Note that the projectors 100a to 100f have much in common, and thus the suffixes a to f will be omitted in the following description, in the case of describing common features. Whereas, in the case of describing the projectors individually, the suffixes a to f will be included in the description.

Detailed Configuration of Smartphone

Figure 2:
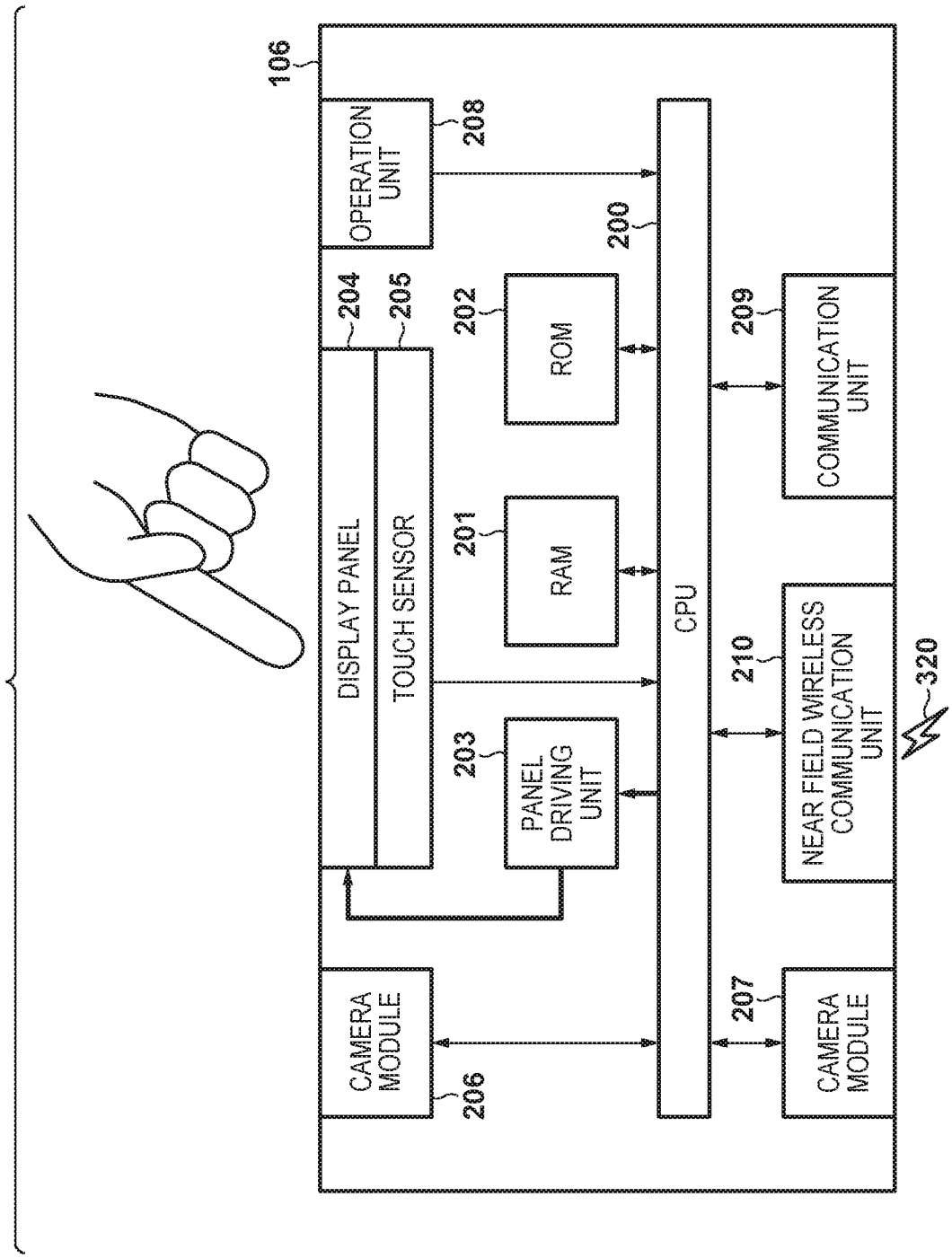
FIG. 2 is a block diagram illustrating an example of a functional configuration of a smartphone according to the first embodiment.

The following will describe the functional configuration of the smartphone 106 with reference to FIG. 2.

Reference numeral 200 denotes a CPU. The CPU 200 includes a processor, and performs overall control of the smartphone 106 by loading a program recorded in a ROM 202 into a RAM 201 and executing it. Reference numeral 201 denotes a RAM. The RAM 201 is a volatile memory, and functions as a work memory used for operation of the CPU 200. Reference numeral 202 is the ROM. The ROM 202 is a nonvolatile memory, and is used to store various types of data. Examples of stored data include an OS (Operating System) for the operation of the CPU 200, program codes of applications, data used when the applications are executed, and multimedia contents.

Reference numeral 203 denotes a panel driving unit. The panel driving unit 203 drives a later-described display panel 204 to display an image in accordance with an instruction from the CPU 200. Reference numeral 204 denotes a display panel. The display panel 204 is configured to show an image to a user, and may be, for example, a liquid crystal panel, an organic EL panel, an electronic paper, or the like. Reference numeral 205 denotes a touch sensor. The touch sensor 205 detects a touch on the display panel 204 made by a user with a finger or a stylus. The touch sensor 205 calculates whether or not a touch was made or calculates information such as a touch position, and transmits the result to the CPU 200. Accordingly, the CPU 200 can calculate the position, in the coordinate system of the display panel 204, at which a touch was made by a user operation. The user gives such touch inputs to operate the smartphone 106. The touch sensor 205 may be, for example, a capacitance type sensor or a pressure-sensitive sensor.

Reference numeral 206 is a camera module. The camera module 206 captures a scene ahead (on the display panel 204 side) of the smartphone 106 in accordance with an instruction from the CPU 200, and transmits the captured image to the CPU 200. Reference numeral 207 is a camera module. The camera module 207 captures a scene behind (on the side opposite to the display panel 204) the smartphone 106 in accordance with an instruction from the CPU 200, and transmits the captured image to the CPU 200.

Reference numeral 208 is an operation unit. The operation unit 208 is an operation member such as a button for receiving an instruction from a user. With the operation unit 208, it is possible to receive, from a user, an instruction to turn power on or off, or an instruction to change the application to be operated, for example.

Reference numeral 209 is a communication unit. The communication unit 209 is constituted by a module for performing wired communication and a module for performing wireless communication. With the communication unit 209, control data, image data, multimedia data, or hypertext data can be transmitted and received to and from an external device, or application codes can be acquired from an external device. The communication unit 209 may be a controller (and an antenna) for communication complying with a standard such as USB (Universal Serial Bus), Ethernet (Registered Trademark), a wireless LAN, or Bluetooth (Registered Trademark).

Reference numeral 210 denotes a near field wireless communication unit. The near field wireless communication unit 210 is a module for performing communication based on a communication protocol complying with, for example, a near field wireless communication standard such as ISO/IEC14443 or ISO/IEC18092, and is constituted by an antenna, a communication controller, and the like. The near field wireless communication unit 210 is capable of performing near field wireless communication 320 with an external device such as a projector 100 that came closer thereto within a predetermined range. The CPU 200 can communicate with an external device such as a projector 100 that is connected through the near field wireless communication 320 established by the near field wireless communication unit 210. The near field wireless communication unit 210 may be a unit based on another communication standard, and any near field wireless communication unit may be used as long as it can detect that the smartphone 106 has been physically held in front of an opposing external device or brought into contact therewith.

Functional Configuration of Projector

Figure 3:
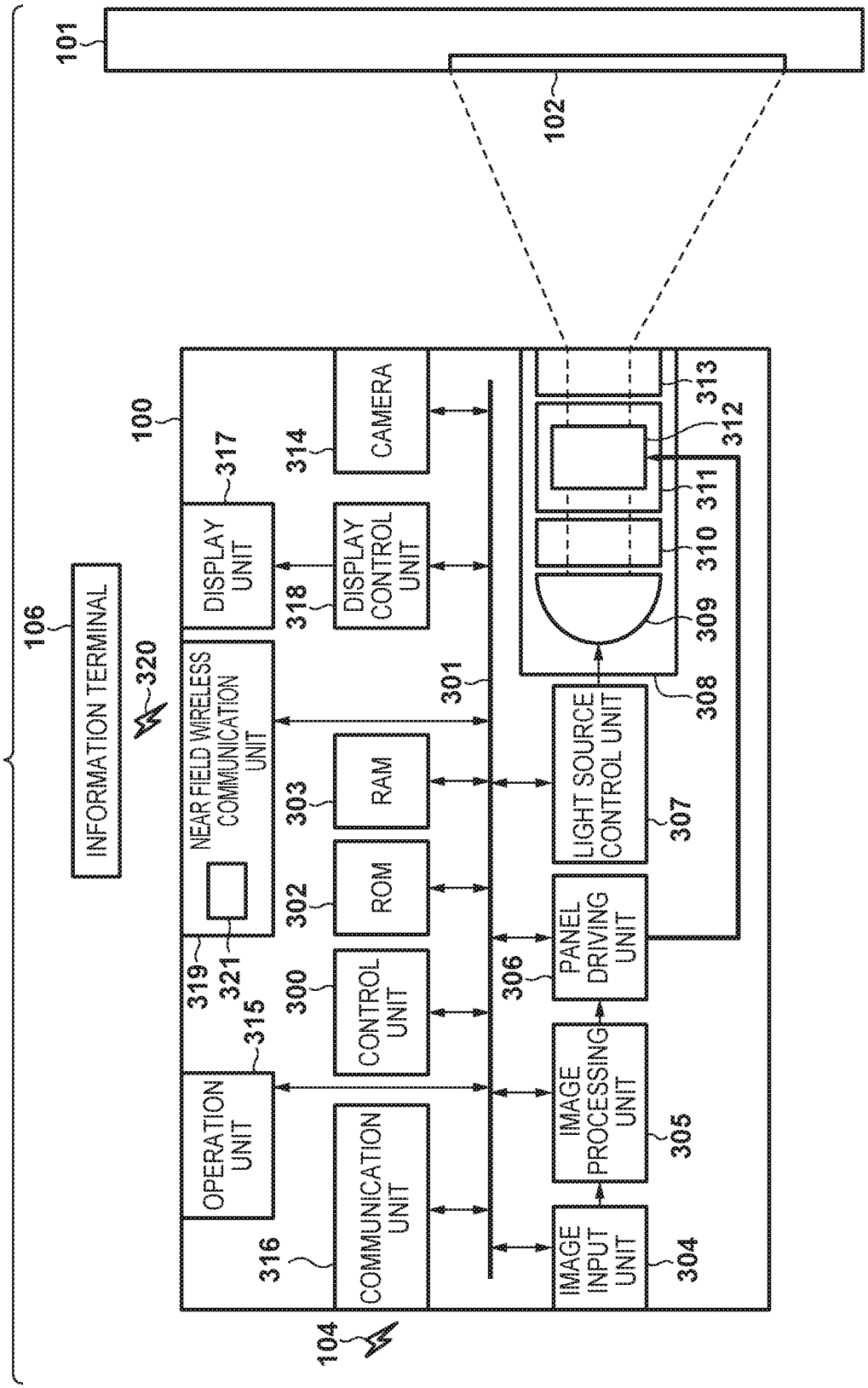
FIG. 3 is a block diagram illustrating an example of a functional configuration of a projector according to the first embodiment.

The following will describe an example of a functional configuration of the projector 100 with reference to FIG. 3. FIG. 3 shows a block configuration of functions of the projector 100.

Reference numeral 300 denotes a control unit. The control unit 300 includes a processor that is, for example, a CPU (or a MPU, a GPU, or the like), and performs overall control of the projector 100 by loading a program stored in a ROM 302 into a RAM 303 and executing it.

Reference numeral 301 denotes a bus. The control unit 300 can communicate with constituent components of the projector 100 via the bus 301. Reference numeral 302 denotes a ROM. The ROM 302 is a nonvolatile memory, and stores programs for operation of the control unit 300, and data required for operation of the projector 100. Reference numeral 303 denotes a RAM. The RAM 303 is a volatile memory, and is used as a work memory used for operation of the control unit 300.

Reference numeral 304 denotes an image input unit. The image input unit 304 receives image data from an external device such as a not-shown personal computer, converts the image data into a format suitable for being processed in a downstream circuit, and outputs the converted image data to an image processing unit 305.

Reference numeral 305 denotes an image processing unit. The image processing unit 305 subjects the input image data to image quality correction such as brightness correction, black level correction, color correction, color conversion, or gamma correction, scaling, frame-rate conversion, or distortion correction such as trapezoidal correction or free-form surface correction, in accordance with an instruction from the control unit 300. Furthermore, the image processing unit 305 can also perform, for multi-projection, dimming processing (so-called edge blending processing) on an area overlapping the projection image screen of another projector. Furthermore, the image processing unit 305 can superimpose an image designated by the control unit 300 onto the input image data display and display the resultant image, in accordance with an instruction from the control unit 300. Accordingly, a menu image for prompting a user to perform operation can be superimposed and displayed. Furthermore, the image processing unit 305 can subject, in accordance with an instruction from the control unit 300, an image to be output to horizontal flip, vertical flip, or horizontal and vertical flip. When the projector 100 performs so-called rear projection of projecting an image onto the rear face of a screen, horizontal flip processing executed by the image processing unit 305 enables the displayed image to appear to be non-inverted when viewed from the front face of the screen. When the projector 100 is installed in a so-called ceiling mount mode with its housing mounted upside down on a ceiling or the like, vertical and horizontal flip processing executed by the image processing unit 305 enables the displayed image to appear to be non-inverted. When the projector 100 installed in the ceiling mount mode performs rear projection, vertical flip processing executed by the image processing unit 305 enables the displayed image to appear to be non-inverted when viewed from the front face of the screen. The image processing unit 305 outputs the processed image data to the panel driving unit 306, which will be described below.

Reference numeral 306 denotes a panel driving unit. The panel driving unit 306 subjects the input image data to gradation conversion so that the degree of light modulation of the panel with respect to the gradation is linear. Furthermore, the converted image data is converted into a driving signal for forming an image on a later-described liquid crystal panel 312, and the driving signal is output to the liquid crystal panel 312. Note that the above-described flip processing may also be executed by the panel driving unit 306, instead of the image processing unit 305.

Reference numeral 307 denotes a light source control unit. The light source control unit 307 performs control such as turning on/off a light source 309, or changing the brightness, in response to an instruction from the control unit 300. Reference numeral 308 denotes an optical system. The optical system 308 includes a later-described light source 309, an illumination optical system 310, a color separation/synthesis optical system 311, a liquid crystal panel 312, and a projection optical system 313. With the optical system 308, light from the light source 309 is modulated on the liquid crystal panel 312, and is projected outward from the projector 100, so that the image is displayed on the screen 101.

Reference numeral 309 denotes a light source. The light source 309 may employ a high-pressure mercury lamp, a halogen lamp, an LED (light-emitting diode), or a laser light source. The light source 309 may be a white light source, or may be constituted by a plurality of light sources for the respective color components of R (Red), G (Green), and B (Blue). Alternatively, the light source 309 may also be constituted by the B light source, and a fluorescence substance for converting the B light into Y (Yellow) light. Reference numeral 310 denotes an illumination optical system. The illumination optical system 310 is constituted by a plurality of lenses, and is configured to homogenize and collimate the light from the light source 309 and illuminate, with the resultant light, the later-described liquid crystal panel 312. Reference numeral 311 denotes a color separation/synthesis optical system. The color separation/synthesis optical system 311 includes the later-described liquid crystal panel 312. The color separation/synthesis optical system 311 separates light from the illumination optical system 310 into light components of red, blue, and green, so that the illumination optical system 310 irradiates the liquid crystal panel 312 therewith. Furthermore, the color separation/synthesis optical system 311 synthesizes light components output from the liquid crystal panel 312 and outputs the synthesized light to the projection optical system 313. Reference numeral 312 denotes a liquid crystal panel. On the liquid crystal panel 312, an image is formed based on driving signals generated by the panel driving unit 306. The liquid crystal panel 312 may be a transmissive liquid crystal panel or a reflective liquid crystal panel. Reference numeral 313 denotes a projection optical system. The projection optical system 313 is constituted by a lens that projects, to the outside, light that was emitted from the light source 309 and was modulated by the liquid crystal panel 312, and the like.

Note that the optical system 308 may also be modified into various forms. For example, if the light source 309 is constituted by light sources for respective colors, no color separation optical system is needed. Furthermore, if the liquid crystal panel 312 is a single panel, and is configured to output colors in a time division manner, no color synthesis optical system is needed. Furthermore, a configuration is also possible in which no liquid crystal panel 312 is provided, and a projection image screen 102 is displayed by scanning, on the screen 101, spot light modulated based on image data. The present embodiment is applicable if, as those described above, optical systems that can modulate light based on image data received from an external device and can project an image are included.

Reference numeral 314 denotes a camera. The camera 314 captures, in accordance with an instruction from the control unit 300, the projection image screen 102 on the screen 101, and transmits the captured image data to the control unit 300. Reference numeral 315 denotes an operation unit. The operation unit 315 includes a button and a touch screen for receiving instructions from a user. The operation unit 315 can receive a user operation such as, for example, turning-on/off instructions, an image processing instruction, and an instruction regarding operation on a menu. Also, the operation unit 315 may be provided with a light receiving win for receiving light such as infrared light, and may be configured to receive a user instruction from a not-shown remote controller.

Reference numeral 316 denotes a communication unit. The communication unit 316 is constituted by a module for performing wired communication and a module for performing wireless communication. With the communication unit 316, command data and image data can be transmitted and received to and from an external device. For example, a command equivalent to a user instruction that is received by the operation unit 315 may also be received via the communication unit 316. The communication unit 316 may be a controller (and an antenna) for communication complying with a standard such as USB (Universal Serial Bus), Ethernet (Registered Trademark), a wireless LAN, or Bluetooth (Registered Trademark).

Reference numeral 317 denotes a display unit. The display unit 317 is controlled by a later-described display control unit 318, and can display an image in accordance with an instruction from the control unit 300. The display unit 317 may be, for example, a liquid crystal panel, an organic EL panel, an electronic paper, or the like. Reference numeral 318 denotes a display control unit. The display control unit 318 includes a circuit for controlling the display unit 317 in response to an instruction from the control unit 300.

Reference numeral 319 denotes a near field wireless communication unit. The near field wireless communication unit 319 is a module for performing communication based on a communication protocol complying with, for example, a near field wireless communication standard such as ISO/TEC14443 or ISO/IEC18092, and includes an antenna, a communication controller, and the like. The near field wireless communication unit 319 is capable of performing the near field wireless communication 320 with an external device such as the smartphone 106 that came closer thereto within a predetermined range. The control unit 300 can communicate with an external device such as the smartphone 106 that is connected through the near field wireless communication 320 established by the near field wireless communication unit 319. The near field wireless communication unit 319 may also include a storage area 321 in which information can be stored, the information being read from or written into the storage area 321 by an external device such as the smartphone 106 through the near field wireless communication 320. When performing the near field wireless communication 320, the near field wireless communication unit 319 can operate by being supplied with electric power from radio waves received by the built-in antenna. Note that access to the storage area 321 from an external device can also be made by not only being supplied with electric power via the antenna, but also being supplied with electric power via a wire from an internal power supply included in the projector 100 or the like. The near field wireless communication unit 319 may also employ another communication standard type, and any method may be employed as long as it can detect that an external device such as the smartphone 106 has been physically held in front of the projector or brought into contact therewith.

Series of Operations of Basic Operation of Smartphone

The following will describe a series of operations of a basic operation of the smartphone 106. The smartphone 106 operates with electric power supplied from a not-shown battery. Upon being supplied with electric power from the not-shown battery, the CPU 200 starts and enters a stand-by state. Here, when a start instruction is input from a user through the operation unit 208, the CPU 200 reads, from the ROM 202, an instruction code of the OS or data required for its operation, starts operating the OS, and controls the display panel 204 to perform corresponding display. Furthermore, applications are stored in advance in the ROM 202. In accordance with an instruction from the user input through the operation unit 208 or the touch sensor 205, the CPU 200 specifies the application to be started, and loads and starts the application. Then, the CPU 200 operates based on the code of the application. Furthermore, the CPU 200 ends the application in accordance with an instruction from the user input through the operation unit 208 or the touch sensor 205. Furthermore, when a shut-down instruction is given from the user through the operation unit 208, the CPU 200 shuts down the OS and returns to the stand-by state.

Series of Operations of Touch Processing Executed on Smartphone

Figure 4A:
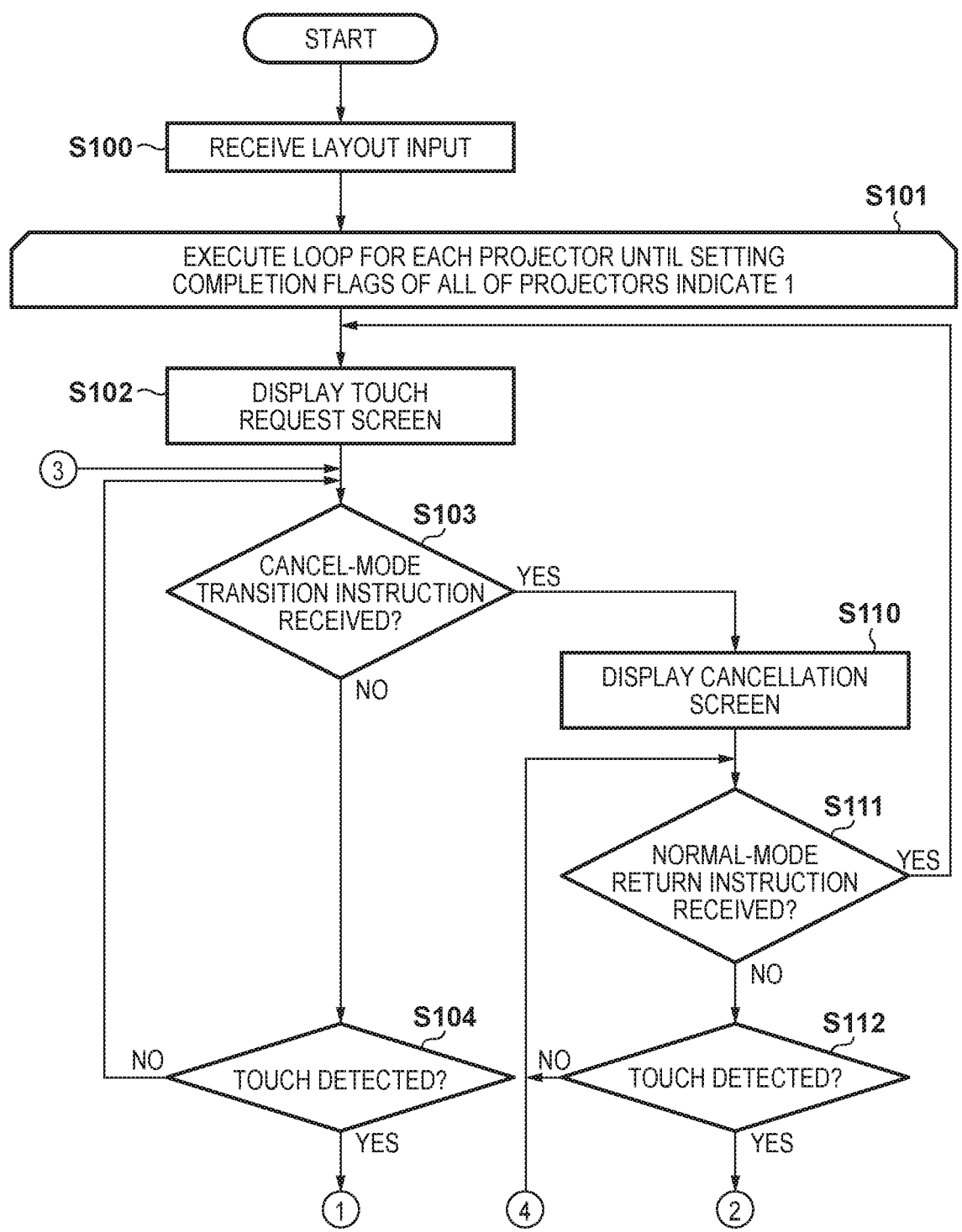
FIGS. 4A and 4B are flowcharts illustrating a series of operations of touch processing that is executed on the smartphone according to the first embodiment.
Figure 4B:
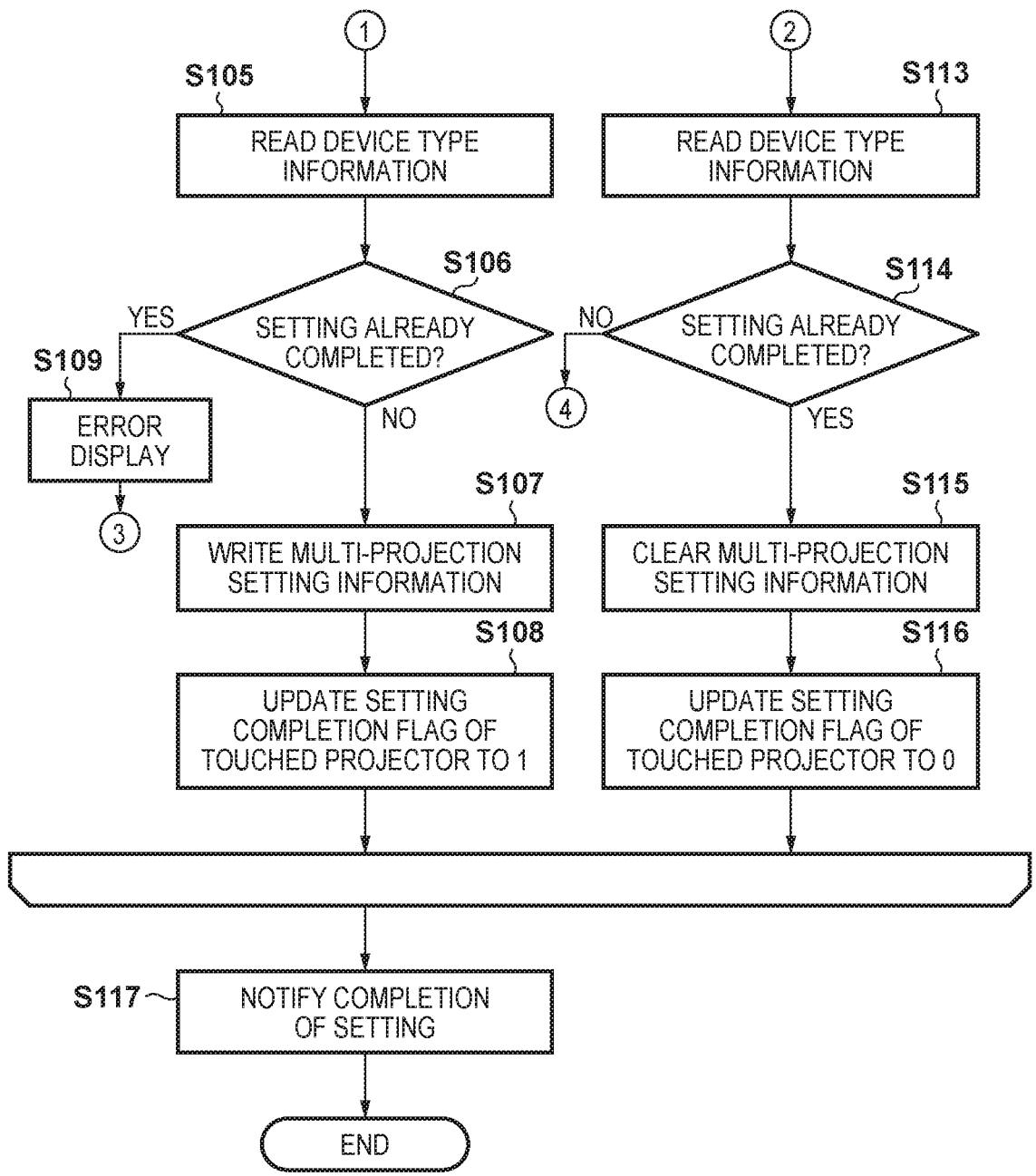

The following will describe a series of operations of touch processing that is executed on the smartphone with reference to FIGS. 4A and 4B. Note that the series of operations shown in FIGS. 4A and 4B are started when, after the CPU 200 has started the OS, for example, a user has input a start instruction for a projector setup application through the touch sensor 205 for example. This application is an application for transmitting, when the projector 100 is touched with the smartphone 106, corresponding multi-projection setting information to the projector 100. The CPU 200 reads, based on the code of the OS, the code of this application and data required for its execution from the ROM 202 onto the RAM 201, and executes control in accordance with the application code.

Figure 5A:
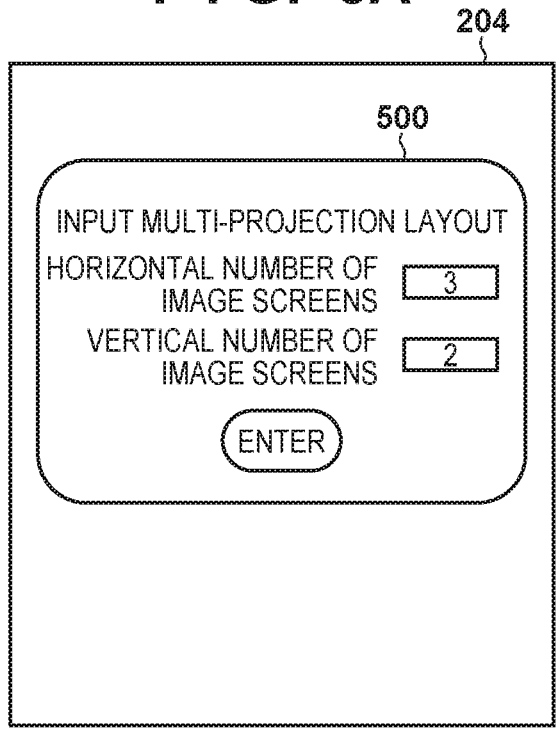
FIGS. 5A to 5C illustrate layout input screens according to the first embodiment.

In step S100, the CPU 200 receives a layout input from the user. Specifically, first, the CPU 200 performs control such that a dialog box (layout input screen) for inputting multi-projection layout information is displayed on the display panel 204, and prompts the user to input layout information. FIG. 5A shows an example of a dialog box 500 that is displayed on the display panel 204 in this step. The dialog box 500 is configured to enable the user to input a layout, namely, the horizontal number of image screens and the vertical number of image screens that constitute the integrated image screen 103. A combination of the horizontal number of image screens and the vertical number of image screens indicates a multi-projection layout of the projectors 100 (hereinafter, the multi-projection layout of the horizontal number n of image screens and the vertical number m of image screens is indicated by "n×m"). In the example shown in FIG. 5A, inputs that correspond to "3×2" layout were made by the user. That is, this layout configures multi-projection of six projectors. The CPU 200 detects, using the touch sensor 205, a tap made by the user on an enter button in the dialog box 500 for example, receives the input from the user, and settles the inputs.

Note that a configuration is also possible in which, when receiving a layout input, the CPU 200 detects the number of projectors 100 connected to the wireless LAN 104 via the communication unit 209, and restricts an input that contradicts the detection result or performs control such that a warning or an error indication is displayed on the display panel 204. For example, if six projectors 100 connected to the wireless LAN 104 are detected, the CPU 200 will perform control such that a numeric value of 7 or greater cannot be input in the box for the horizontal number of image screens, or a warning or an error indication will be displayed on the display panel 204 upon input of a numeric value of 7 or greater.

Then, the CPU 200 executes a loop starting from step S101. This loop is to configure multi-projection settings, using the near field wireless communication 320, according to the number of projectors 100 constituting the layout that was input in step S100. Before executing this loop, the CPU 200 generates in advance a table 800, which is exemplified in FIG. 8, in the RAM 201.

The table 800 is used to manage the following information for each of the projectors 100 constituting the layout. A column 801 indicates numbers defined in continuous indices, for example. A column 802 indicates individual information relating to each image screen of the layout. This information for multi-projection is set individually for each projector, and is given in values that indicate, for example, its horizontal position and vertical position in the layout. A column 803 indicates later-described identifiers of the projectors, and is blank in an initial state. A column 804 indicates setting completion flags, which indicate that multi-projection setting is complete. 0 is set in the initial state indicating "non-set", and 1 is set when the multi-projection setting for the corresponding projector 100 is complete. Furthermore, even once multi-projection setting is complete, the setting will be cleared to 0 if the setting becomes invalid thereafter. Note that the loop in step S101 is executed on every projector until the setting completion flags of all of the projectors 100 constituting the layout indicate 1.

Referring to FIG. 4A again. When the loop is started in step S101, the CPU 200 generates, in step S102, a dialog box (touch request screen) for prompting the user to touch a projector 100 with the smartphone 106, and performs control such that the dialog box is displayed on display panel 204. The CPU 200 performs control such that different contents of touch request screens are displayed according to the state of the setting completion flags of the projectors 100 constituting the layout. Hereinafter, examples of display contents of the touch request screen will be described with reference to FIGS. 6A to 6K.

FIG. 6A shows an example of a touch request screen (dialog box 600a). The CPU 200 performs control such that the touch request screen shown in this example is displayed when the setting completion flags of all of the projectors 100 indicate 0.

The CPU 200 generates a layout image 601a in the dialog box 600a to show a projector to be touched to the user. The layout image 601a indicates a multi projection layout, and the CPU 200 generates the layout image 601a based on the layout information (the horizontal number of image screens and the vertical number of image screens) input in step S100. The example of FIG. 6A shows a 3×2 layout. Here, the layout image 601a is shown in a matrix form of 3 rectangles horizontally by 2 rectangles vertically, each rectangle indicating the projection image screen of a projector. Furthermore, the CPU 200 may also display numeric values or IDs for identifying the respective rectangles of the matrix that are added to the layout image 601a. The present example uses the numbers shown in the column 801 of the table 800 shown in FIG. 8.

When generating the layout image 601a, the CPU 200 selects the rectangle that corresponds to the projector 100 that the user is to be prompted to touch (to be close to), and displays the selected rectangle so that it is distinguishable from the rectangles that correspond to the other projectors 100. In the example shown in FIG. 6A, since the setting completion flags of all of the projectors indicate 0, the CPU 200 only needs to select the rectangle that corresponds to the first projector ordered by a predetermined method. In this example, the upper left rectangle (rectangle 610) is selected. For example, by showing the selected rectangle 610 with hatched lines, the rectangle 610 that is a projector that the user is to be prompted to touch is displayed so as to be distinguishable from the rectangles that correspond to the other projectors 100. Of course, in place of the display method using hatched lines, any display method may be used as long as it can make a projector to be touched distinguishable from the other projectors. For example, the rectangle 610 that is a projector to be touched may also be displayed with a color or brightness that is different from that of the other rectangles. Alternatively, a text or an icon may be added to the rectangle 610 that is a target projector to be touched to enable it to be distinguishable from the other rectangles. Another method may also be used. By displaying the dialog box of FIG. 6A in this way, it is possible to prompt the user to touch the projector (for example, the projector 100d in FIG. 1) that corresponds to the upper left rectangle 610 of the layout with the smartphone 106.

Also, FIG. 6B shows an example of a touch request screen (dialog box 600b) in a different form. Note that descriptions common with FIG. 6A are omitted. This example assumes that the setting completion flag of the upper left projector (for example, projector 100d) in the multi-projection layout indicates 1, and the setting completion flags of the other projectors indicate 0.

The CPU 200 displays a layout image 601b that simulates a layout, similar to the above-described layout image 601a, to show a projector to be touched to the user. When generating the layout image 601b, the CPU 200 selects the rectangle that corresponds to the projector that the user is to be prompted to touch, and displays the selected rectangle so that it is distinguishable from the rectangles that correspond to the other projectors 100. In the example shown in FIG. 6B, since the setting completion flags of the projectors excluding the upper left projector indicate 0, the CPU 200 only needs to select, for example, the rectangle that corresponds to the first one of the projectors whose setting completion flags indicate 0. In this example, the rectangle (rectangle 611) to the right of the upper left rectangle is selected.

Note that examples have been described in which the rectangle that corresponds to the projector to be touched and the rectangles that correspond to the other projectors are displayed so as to be distinguishable. Additionally, display may also be possible such that a rectangle that corresponds to a projector whose setting completion flag indicates 0, and a rectangle that corresponds to a projector whose setting completion flag indicates 1 are distinguishable. In the above-described example, the frame of the rectangle that corresponds to the projector whose setting completion flag indicates 0 (and that are not a touch target) is indicated by a dotted line. On the other hand, the frame of the rectangle 610 that corresponds to the projector whose setting completion flag is 1 is indicated by a solid line. Note that another display method may also be used as long as it can make them distinguishable.

Furthermore, as shown in the example of FIG. 6B, if there are at least two projectors whose setting completion flags indicate 1, the CPU 200 displays a cancel-mode transition button 602*b* in the dialog box 600*b*. This button is used to transition to a mode of cancelling the setting of the projector (projector whose setting completion flag indicates 1) for which multi-projection setting has already been complete. The operation that is performed when a user has tapped this button will be described later.

By displaying the dialog box shown in FIG. 6B in this way, it is possible to prompt a user to touch the projector (for example, the projector 100*e* in FIG. 1) that corresponds to the rectangle 611 with the smartphone 106.

A further description will be given with reference to FIG. 4A again. In step S102, the CPU 200 performs control such that an image that simulates a multi-projection layout is displayed on the display panel 204. Then, the CPU 200 references the setting completion flags of the projectors, and highlights a partial image of the layout-simulating image that corresponds to one image screen so as to prompt the user to touch, with the smartphone 106, the non-set projector that corresponds to the one image screen.

In step S103, the CPU 200 determines whether or not a cancel-mode transition instruction has been given. Specifically, if, in step S102, there is a projector whose setting completion flag indicates 1, the CPU 200 determines whether or not the cancel-mode transition button (602*b* in FIG. 6B) shown in the dialog box 600*b* has been tapped by the user. If it is determined that a cancel-mode transition instruction has been given, the CPU 200 moves to step S110, whereas if it is determined that no such an instruction has been given, the CPU 200 moves to step S104.

In step S104, the CPU 200 determines whether or not a touch on the projector 100 has been detected. Specifically, the CPU 200 first controls the near field wireless communication unit 210 to start detecting a projector 100 to be communicated with through near field wireless communication. If it is determined by the CPU 200 that a projector 100 (a touch) has been detected, as a result of the projector 100 and the smartphone 106 coming close to each other within a predetermined distance range, the near field wireless communication 320 is established therebetween, and the procedure moves to step S105. On the other hand, if no projector 100 has been detected, the procedure returns to step S103.

In step S105, device type information stored in the storage area 321 of the projector 100 with which the communication has been established is read through the near field wireless communication 320 established in step S104. Here, information stored in the storage area 321 will be described specifically with reference to FIG. 7.

Figure 7:
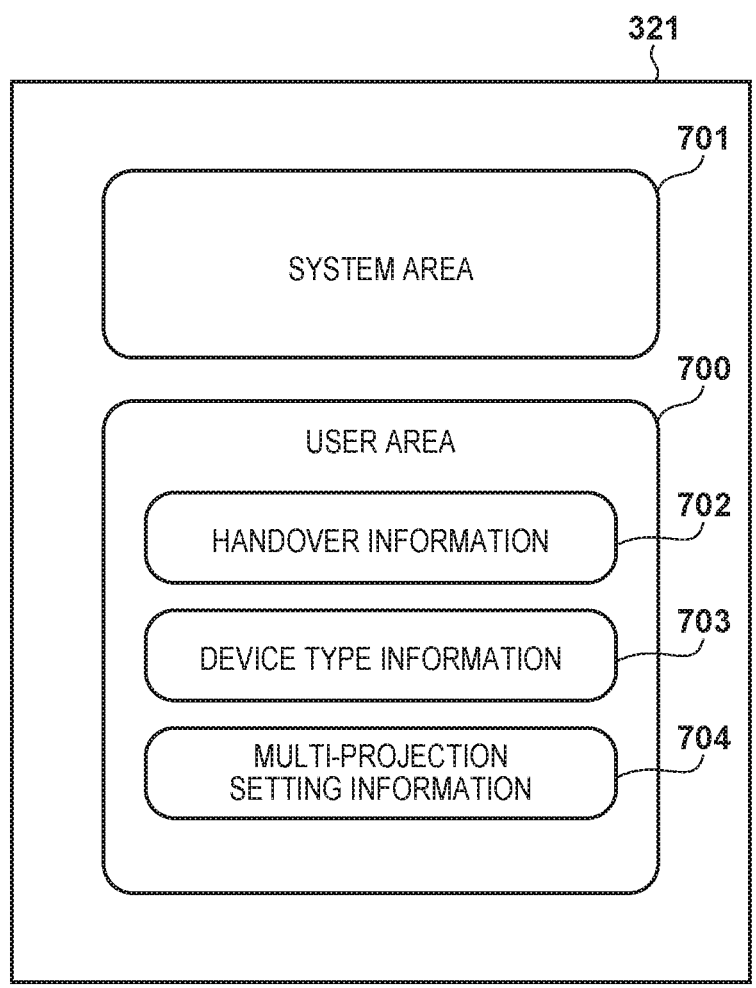
FIG. 7 is a diagram illustrating a storage area of a near field wireless communication unit of the projector of the first embodiment.

FIG. 7 shows an example of information that is stored in the storage area 321 of the near field wireless communication unit 319 of a projector 100. The storage area 321 is broadly classified into two storage areas, namely, a user area 700 and a system area 701. Note that, in the present embodiment, it is assumed that information that is stored in the storage area 321 is of NDEF (NFC Data Exchange Format), but the information may be of another format.

The user area 700 is an area that is available for a user who uses the near field wireless communication unit 319 and applications, and corresponds to the storage area into and from which information is read or written by an external device such as the smartphone 106 through the near field wireless communication 320. In the user area 700, handover information 702, device type information 703, and multi-projection setting information 704 are stored.

The handover information 702 is information that is used for the smartphone 106 to establish wireless LAN communication (by performing so-called handover from near field wireless communication). The handover information 702 includes, for example, SSID and security key of a not-shown access point, and the IP address (identifier) of the projector 100. For example, if no wireless LAN communication has been established in advance, the smartphone 106 can read in advance the handover information 702 through the near field wireless communication 320 to establish a wireless LAN, and thus establish wireless LAN communication with the projector 100.

The device type information 703 includes a unique identifier for identifying the projector 100. The identifier may be an address for use in predetermined communication. For example, the identifier may be an IP address or a MAC address. Furthermore, the device type information 703 may include a model number information, a serial number, or the like.

The multi-projection setting information 704 includes multi-projection layout information (the horizontal number of image screens and the vertical number of image screens) and individual layout information (position information indicating the horizontal position and vertical position with respect to the entirety). Furthermore, a value indicating front projection or rear projection, widths of an edge blending area (widths in the horizontal direction and in the vertical direction), a value indicating whether or not it is ceiling mount installation, a correction value for adjusting the color or brightness, a value indicating an aspect ratio, a distortion correction value, and the like may also be included.

The system area 701 is an area in which information for use in configuring various settings relating to the near field wireless communication unit 319 is stored, and is used in configuring various settings relating to the near field wireless communication unit 319. Based on the information stored in the system area 701, for example, settings relating to a timing of communication between the near field wireless communication unit 319 and the control unit 300, and settings relating to authorization for reading and writing from and into the near field wireless communication unit 319 by an external device can be configured.

A further description will be given with reference to FIG. 4B again. As described above, upon reading the device type information 703 from the storage area 321 of the projector 100 through the near field wireless communication 320 established in previous step S104, the CPU 200 moves to step S106.

In step S106, the CPU 200 determines whether or not the multi-projection setting for the touched projector 100 is complete. Specifically, the CPU 200 searches for, in the column 803 of the table 800 shown in FIG. 8, the identifier value of the projector 100 included in the device type information 703 read out in immediately previous step S105. If, in the table 800, there is already the identifier read out in immediately previous step S105, and the corresponding setting completion flag in the column 804 indicates 1, the CPU 200 determines that the multi-projection setting for this projector has been completed separately. If it is determined that the setting has already been completed, the CPU 200 moves to step S109, and otherwise to step S107.

In step S107, the CPU 200 writes the multi-projection setting information 704 into the storage area 321 of the near field wireless communication unit 319 of the projector 100. Specifically, the CPU 200 first reads, from the table 800, information of the row that corresponds to the projector indicated as a touch target in the dialog box in previous step S102 (that is, in the same loop). For example, if the display shown in FIG. 6A has been performed in step S102, information of the row number 1 (corresponding to the rectangle 610) in the table 800 is read. Furthermore, if the display shown in FIG. 6B has been performed in step S102, information of the row number 2 (corresponding to the rectangle 611) in the table 800 is read. Then, the CPU 200 writes, as multi-projection setting information 704, the following information into the storage area 321 of the projector 100 through the near field wireless communication 320. One type of the information is the layout information (the horizontal number of image screens and the vertical number of image screens) input in step S100. The other one is the individual layout information (the horizontal position and the vertical position) of the column 802 read out from the table 800. For example, if the display shown in FIG. 6A has been performed in step S102, the CPU 200 writes, as the multi-projection setting information 704, information of (3, 2, 1, 1) that respectively indicate the horizontal number of image screens, the vertical number of image screens, the horizontal position, and the vertical position. For example, if the display shown in FIG. 6B has been performed in step S102, information of (3, 2, 2, 1) that respectively indicate the horizontal number of image screens, the vertical number of image screens, the horizontal position, and the vertical position, is written as the multi-projection setting information 704.

In step S108, the CPU 200 updates the table 800. Specifically, in the table 800, the value of the row in the column 804 (setting completion flag) that corresponds to the projector indicated in the dialog box as a touch target in previous step S102 is changed to 1. Furthermore, the identifier value included in the device type information 703 read out in previous step S105 is stored in this row in the column 803 (projector identifier). That is, completion of the setting of this projector is recorded in the table 800. Then, the CPU 200 has completed one loop starting from step S101.

On the other hand, if it is determined in step S106 above that the setting of the projector to be touched has already been completed, the CPU 200 performs, in step S109, error display on the display panel 204. Here, the error display will be described with reference to FIGS. 6C to 6D, for example. Note that, for the sake of description, a state in which the setting completion flags of the projectors of the rows 1 to 3 in the table 800 indicate 1, and the setting completion flags of the projectors of the rows 4 to 6 indicate 0 is taken as an example.

FIG. 6C shows an example of a touch request screen (dialog box 600c) shown in step S102 in this state. Here, a layout image 601c in the dialog box 600c is shown to a user with the lower left rectangle (rectangle 613) serving as a touch target. In this dialog box, since there are projectors whose setting completion flags indicate 1, a cancel-mode transition button 602c is displayed. Then, if the user has touched the projector (for example, the projector 100e in FIG. 1) that corresponds to the rectangle 611 of the layout image 601c with the smartphone 106, the CPU 200 determines that the touched projector has already been set (that is, Yes).

In this case, in step S109, the CPU 200 displays a dialog box 600d shown in FIG. 6D on the display panel 204. The CPU 200 displays, in the dialog box 600d, an error message "touched projector 2 has been set" for example, and the rectangle (rectangle 611) that corresponds to the touched projector so as to be distinguishable from the other rectangles. In this example, the frame of the rectangle 611 is indicated by a heavy line so as to be noticeable. Of course, another display method that can make the corresponding rectangle distinguishable from the other rectangles may also be used. Note that the CPU 200 only needs to specify the touched projector based on the row in the table 800 that was found in the search performed in step S106. Upon completion of the error display, the CPU 200 returns to the procedure in step S103.

Note that a configuration is also possible in which, in step S109 above, if it is determined that the projector 100 touched in the execution of the previous loop has been touched again within a predetermined time period, the CPU 200 moves to step S103 without performing error display. This is to avoid adverse effects of false detection caused by multiple touches (although one touch was intended) when the user touches the projector 100 with the smartphone 106. When error display is omitted in such a case, it is possible to reduce complication of error display made with respect to unintended touches.

Figure 6E:
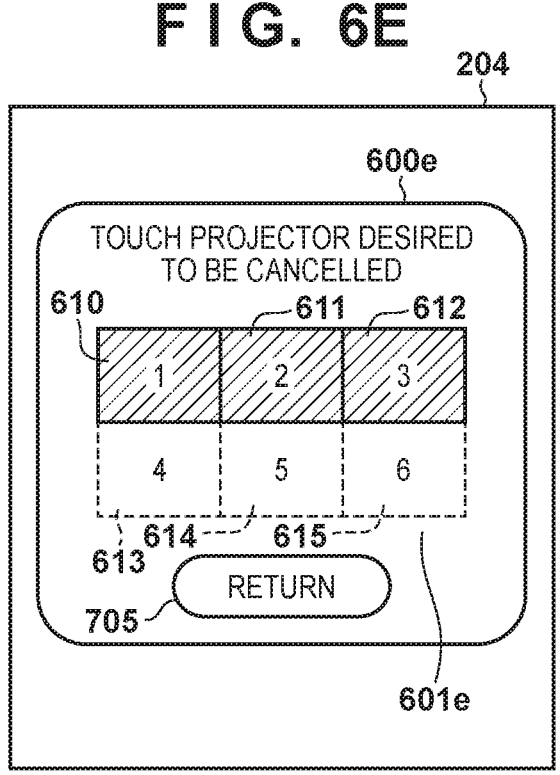

On the other hand, if it is determined in step S103 that a cancel-mode transition instruction has been given, the CPU 200 displays, in step S110, a dialog box 600e (cancellation screen) for receiving a cancellation instruction on the display panel 204. The display of the cancellation screen will be described with reference to FIGS. 6C and 6E. Also, here, the same state as that described with reference to FIG. 6C is taken as an example. That is, the setting completion flags of the projectors that correspond to the numbers 1 to 3 in the table 800 indicate 1, and the setting completion flags of the projectors that correspond to the numbers 4 to 6 indicate 0. In this state, the CPU 200 displays, in step S102, the dialog box 600c shown in FIG. 6C. It is also assumed that the user has tapped the cancel-mode transition button 602c indicated on the display panel 204. At this time, in step S103, the CPU 200 determines that a cancel-mode transition instruction has been given (that is, Yes), and moves to step S110. In step S110, the CPU 200 displays the dialog box 600e (cancellation screen) shop n in FIG. 6E on the display panel 204. The CPU 200 displays, for example, a request message "touch the projector desired to be cancelled" in the dialog box 600e. Based on the information in the table 800, the rectangles (rectangles 610 to 612) that correspond to the projectors whose setting completion flags indicate 1 are displayed so as to be distinguishable from the rectangles (rectangles 613 to 615) that correspond to the other projectors. In this example, the rectangles 610 to 612 are displayed while being highlighted with hatched lines. Of course, another display method that can make the corresponding rectangle distinguishable from the other rectangles may also be used. Furthermore, the CPU 200 displays, in the dialog box 600e, a normal-mode return button 705 for returning from a cancel mode to a normal mode.

In step S111, the CPU 200 determines whether or not a normal-mode return instruction has been given. For example, the CPU 200 determines whether or not a normal-mode return instruction has been given by determining, for example, whether or not the normal-mode return button 705 displayed in the dialog box 600e has been tapped by the user. If the normal-mode return button 705 has been tapped, the CPU 200 determines that the normal-mode return instruction has been given, and the procedure returns to step S102. Otherwise to step S112.

In step S112, the CPU 200 determines whether or not a touch on a projector 100 has been detected. Specifically, the CPU 200 first controls the near field wireless communication unit 210 to start detecting a projector 100 to be communicated with through near field wireless communication. If it is determined by the CPU 200 that a projector 100 has been detected (a touch has been detected), as a result of the projector 100 and the smartphone 106 coming close to each other within a predetermined distance range, the near field wireless communication 320 is established therebetween, and procedure moves to step S113. On the other hand, if no projector 100 has been detected, the procedure returns to step S111.

In step S113, device type information stored in the storage area 321 of the projector 100 with which the communication has been established is read through the near field wireless communication 320 established in step S112.

In step S114, the CPU 200 determines whether or not multi-projection settings for the touched projector 100 is complete. Specifically, the CPU 200 searches for, in the column 803 of the table 800 shown in FIG. 8, the identifier value of the projector 100 included in the device type information 703 read out in immediately previous step S113. If, in the table 800, there is already the identifier read out in immediately previous step S113, and the corresponding setting completion flag in the column 804 indicates 1, the CPU 200 determines that the multi-projection setting for this projector has been separately completed. If it is determined that the setting has already been completed, the CPU 200 moves to step S115 to cancel this setting. Otherwise, the CPU 200 determines that the appropriate object to be cancelled has not been selected, and returns to step S111.

In step S115, the CPU 200 writes (clears) data indicating "non-set" as the multi-projection setting information 704 into the storage area 321 of the corresponding projector through the near field wireless communication 320 established in previous step S112.

Figure 8:
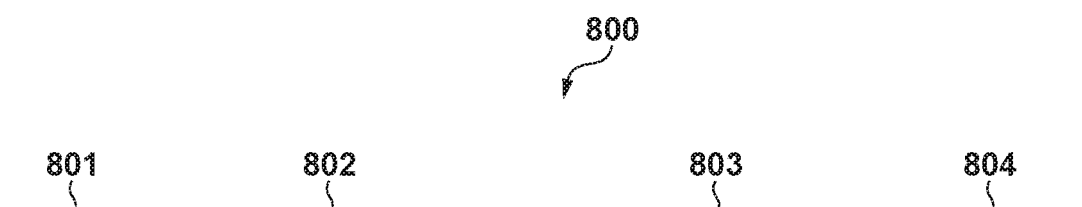
FIG. 8 is a diagram illustrating a table relating to multi projection settings according to the first embodiment.

In step S116, the CPU 200 updates the table 800 shown in FIG. 8. Specifically, in the table 800, the setting completion flag of the row that corresponds to the projector with which the near field wireless communication has been established in previous step S112 is set to 0. Furthermore, the value of this row in the identifier column is cleared. That is, the table 800 is changed so that the projector to be processed indicates as being non-set. Then, the CPU 200 completes the loop starting from step S101 once.

If the condition for completion of the loop starting from step S101 is met, the CPU 200 communicates, in step S117, with the projectors 100 configuring multi projection using a communication method different from the near field wireless communication, and transmits a notification that the setting for all of the projectors is complete. In addition to communicating the multi-projection setting information 704 through the near field wireless communication 320, the CPU 200 may also read IP addresses or the like of the projectors 100 from the handover information 702 or the like, and use the read IP addresses or the like in this step. That is, a configuration is also possible in which, based on the read information, communication with the projectors 100 is established via the communication unit 209. Note that this step may also be an option.

Then, the CPU 200 ends this series of operations. After the completion of the series of operations, the projector setup application may be ended, or the series of operations may also be executed again instead of ending the application.

Note that the present embodiment has described an example in which identifiers of the device type information 703 are used as the identifiers described in the table 800 shown in FIG. 8. However, in place of the identifiers of the device type information 703, any information may be applied to the present embodiment as long as it can identify the projectors 100. For example, the CPU 200 may also use IP addresses or the like included in the handover information 702. In this case, in steps S105 and S113 of the series of operations shown in FIG. 4B, the CPU 200 may read the handover information 702 instead of the device type information 703. In this case, a configuration is also possible in which the device type information 703 is not included in the storage area 321.

Figure 5B:
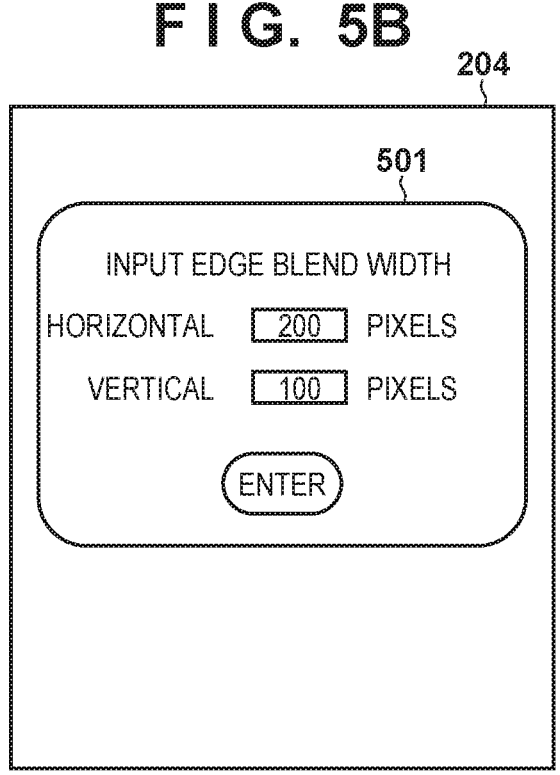

Furthermore, the foregoing embodiment has described an example in which, in step S100, display is performed for prompting the user to input, as the layout information, the horizontal number of image screens and the vertical number of image screens for multi projection. However, display may also be performed for prompting the user to input another type of information for use in multi projection. For example, in step S100, the CPU 200 may display the dialog box 500 shown in FIG. 5A, and display, upon receiving inputs of the horizontal number of image screens and the vertical number of image screens for multi projection, a dialog box 501 shown in FIG. 5B on the display panel 204. The dialog box 501 is a screen for prompting a user to input the widths of an overlapping area (so-called edge blending area) between image screens in multi projection. For example, as information relating to the widths of the edge blending area, the width (for example, $EB_H$ shown in FIG. 1) of the overlapping area between image screens adjacent to each other in the horizontal direction, and the width (for example, $EB_V$ shown in FIG. 1) of the overlapping area between image screens adjacent to each other in the vertical direction may also be input. Note that, in the example shown in FIG. 5B, it is assumed that overlapping areas in multi projection have the same width in the horizontal and vertical directions. That is, in the example shown in FIG. 1, the distances, in the horizontal direction, between the projection image screen 102a and the projection image screen 102b, between the projection image screen 102b and the projection image screen 102c, between the projection image screen 102d and the projection image screen 102e, and between the projection image screen 102e and the projection image screen 102f are equal. Furthermore, the distances, in the vertical direction, between the projection image screen 102a and the projection image screen 102d, between the projection image screen 102b and the projection image screen 102e, and between the projection image screen 102c and the projection image screen 102f are equal. Actually, there are many setups that are in line with such an assumption, and thus the example as shown in FIG. 5B is highly convenient due to its reduced number of input items. On the other hand, a configuration is also possible in which the widths of all of the overlapping areas between image screens can be individually input, so as to cover a setup mode having complicated overlapping areas. Furthermore, a configuration is also possible in which, in the same dialog box, another type of information for use in multi projection is input. In addition to information relating to edge blending areas, target values for display brightness and illumination intensity, target values of chromatic coordinates, adjusted values to be set to a common value within multi projection, and the like may also be input. In this case, in step S107, the CPU 200 only needs to write, as the multi-projection setting information 704, such information of the various types together with information relating to the horizontal position and the vertical position in a layout, into the user area 700 of the storage area 321.

Furthermore, in the above-described embodiment, when the CPU 200 receives an input of a layout, all of the projectors 100 neither need to be connected to the wireless LAN 104 nor need to have been arranged (have been laid out). For example, a configuration is also possible in which, after having received a layout desired by the user (a layout that the user has on his or her mind) in step S100, the CPU 200 executes one loop starting from step S101, and the user installs or arranges the projectors 100 one by one for every loop starting from step S101.

Series of Operations of Touch Response Processing of Projector

Figure 9:
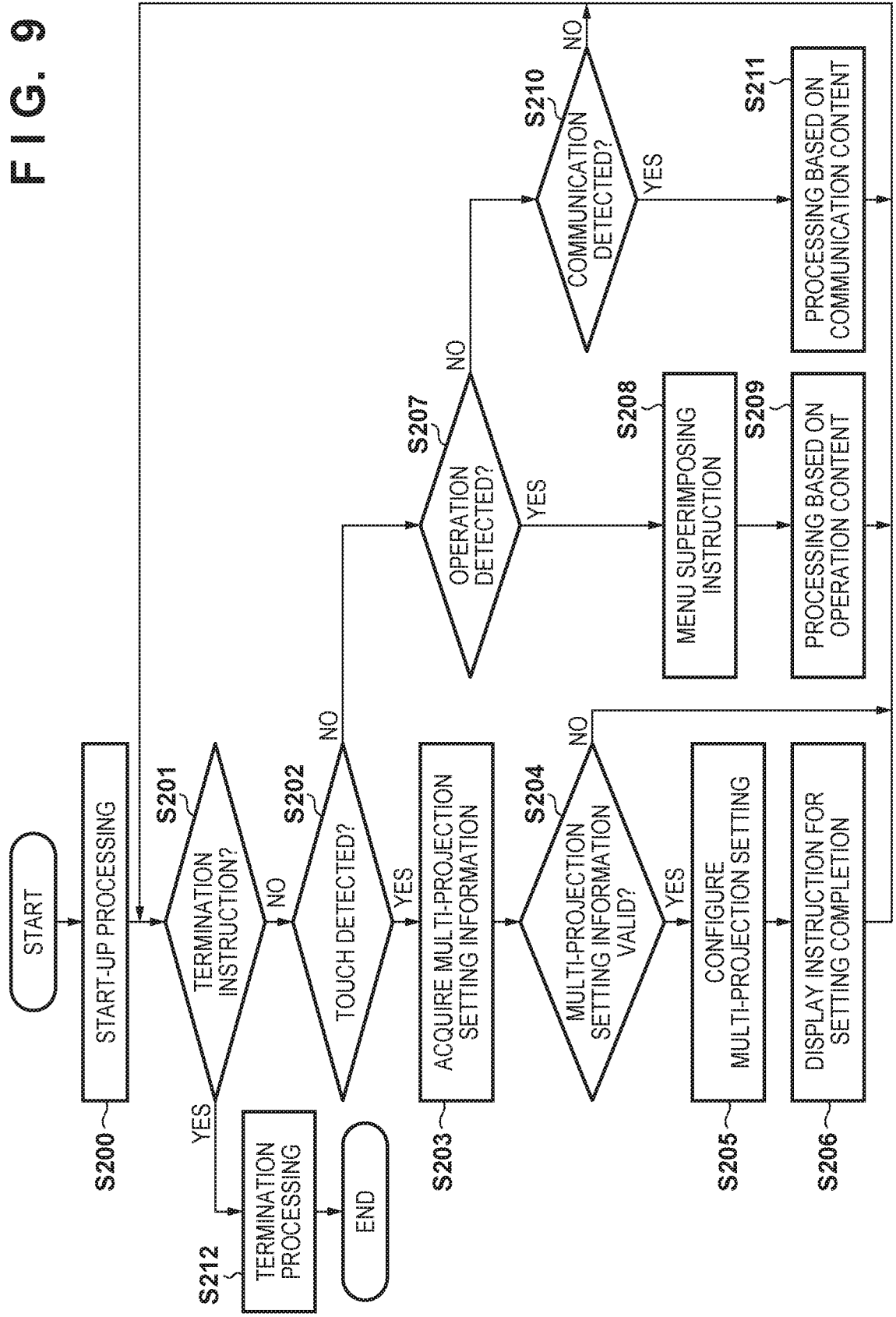
FIG. 9 is a flowchart illustrating a series of operations of the projector according to the first embodiment.

The following will describe a series of operations of touch response processing of a projector 100 with reference to FIG. 9. Note that this processing is realized by the control unit 300 loading the program stored in the ROM 302 into a work area of the RAM 303, executing the loaded program, and controlling the constituent components such as the panel driving unit 306. When the projector 100 is supplied with AC power via a not-shown power supply cable, the control unit 300, the bus 301, the ROM 302, the RAM 303, the communication unit 316, and the operation unit 315 are supplied with power, and the control unit 300 starts and enters the stand-by state. Here, upon detecting a reception of a turning-on instruction from a user via the operation unit 315 or the communication unit 316, the control unit 300 enters the projection state and starts this processing.

In step S200, the control unit 300 executes start-up processing. For example, the control unit 300 performs control such that the constituent components are supplied with power, and configures settings so that the image input unit 304, the image processing unit 305, the panel driving unit 306, the light source control unit 307, and the camera 314 are operable. Furthermore, the control unit 300 instructs the light source control unit 307 to emit light from the light source 309, and operates a not-shown cooling fan. Accordingly, the projector 100 starts projection display of image data received from the image input unit 304 or the communication unit 316. Note that the control unit 300 may also instruct the image processing unit 305 to display a menu or perform image quality correction, in accordance with a command received via the communication unit 316 or the operation unit 315.

In step S201, the control unit 300 determines whether or not a termination instruction from the user has been received. If a turning-off instruction from the user has been received via, for example, the operation unit 315 or the communication unit 316, the control unit 300 determines that the termination instruction has been received, and moves to step S212. On the other hand, if no turning-off instruction has been received (during a predetermined time period), the control unit 300 determines that no turning-off instruction has been received from the user, and moves to step S202.

In step S202, the control unit 300 determines whether or not a touch (with the smartphone 106) has been detected. Specifically, if it is determined by the control unit 300 that the smartphone 106 (a touch) has been detected, as a result of the projector 100 and the smartphone 106 coming close to each other within a predetermined distance range, the near field wireless communication 320 is established therebetween, and the procedure moves to step S203. On the other hand, if no smartphone 106 has been detected, the procedure returns to step S207.

In step S203, the control unit 300 acquires multi-projection setting information. Specifically, first, the multi-projection setting information is written by the smartphone 106 into the user area 700 of the storage area 321 of the projector 100 through the near field wireless communication 320 (step S107 or S115 shown in FIG. 4B). The control unit 300 reads out the written multi-projection setting information from the user area 700 of the storage area 321. Accordingly, the control unit 300 acquires the multi-projection setting information 704 written by the smartphone 106 or the multi-projection setting information 704 cleared by the smartphone 106 in step S115.

In step S204, the control unit 300 determines whether or not the multi-projection setting information acquired in step S203 is valid. If the multi-projection setting information has not been set or is invalid data, the control unit 300 determines that the multi-projection setting information is invalid, and moves to step S201. Otherwise, the control unit 300 moves to step S205.

Note that, if it is determined that the multi-projection setting information is invalid, the control unit 300 may delete, prior to moving to step S201, the multi-projection setting information. Specifically, if the multi-projection setting has been configured in later-described step S205 previously, the control unit 300 may delete the multi-projection setting information that has been determined as invalid. Furthermore, the control unit 300 may also control, prior to moving to step S201, the image processing unit 305 to generate an image for giving a notification that the multi-projection setting has not been configured through the near field wireless communication 320, and project and display this image. Also, a configuration is possible in which the image processing unit 305 is controlled to delete the projected and displayed image after the elapse of a certain period of time.

In step S205, the control unit 300 configures settings, based on the multi-projection setting information acquired in step S203, so that the projection image screen of the projector 100 forms part of the multi projection. There are various multi-projection settings, but here an example thereof will be described with reference to FIG. 10.

Figure 10:
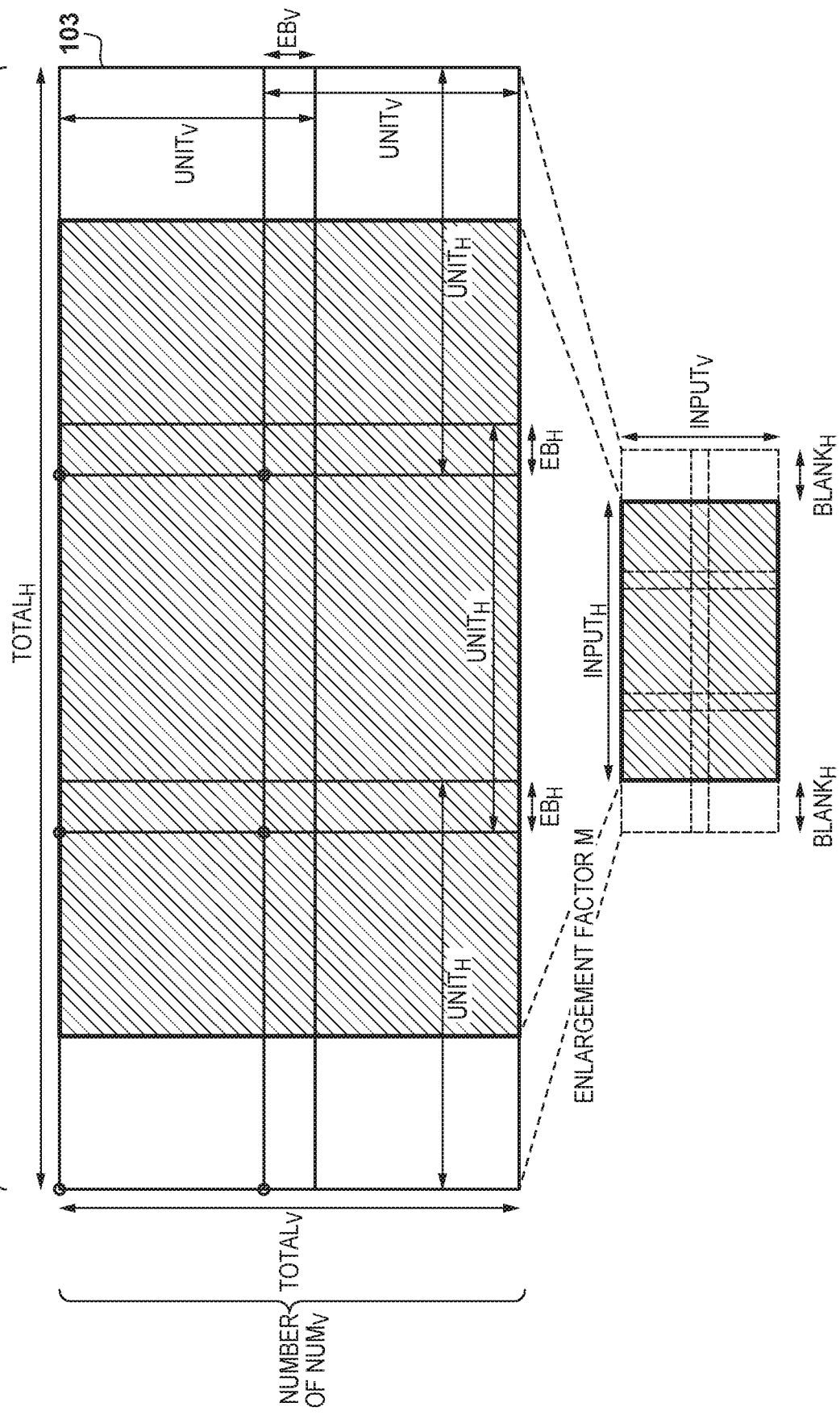
FIG. 10 is a diagram illustrating multi projection settings according to the first embodiment.

FIG. 10 shows an example of the integrated image screen 103 of multi projection configured by projectors 100 the number of which is obtained by multiplying the horizontal number $NUM_H$ by the vertical number $NUM_V$. The overlapping areas (edge blending areas) in the horizontal direction between individual image screens are equal to the width of $EB_H$ pixels. The overlapping areas (edge blending area) in the vertical direction between individual image screens are equal to the width of $EB_V$ pixels. The width and the height of the image screen projected and displayed by each projector 100 are respectively defined as $UNIT_H$ pixels and $UNIT_V$ pixels. The width and the height of an input image are respectively defined as $INPUT_H$ pixels and $INPUT_V$ pixels. Input image data is input to all of the projectors 100, and each projector 100 realizes multi projection by enlarging the input image data m-times and cutting out and displaying the associated area. Here, "$NUM_H$" and "$NUM_V$" are known from the layout information (the horizontal number of image screens and the vertical number of image screens) included in the multi-projection setting information 704 read out in step S203. "$EB_H$" and "$EB_V$" are known because they are input by the user through a later-described menu of the projector 100 or are input from an external device via the communication unit 316 or the near field wireless communication unit 319, or are known because they are included in the multi-projection setting information 704. "$UNIT_H$" and "$UNIT_V$" are known because they are included in the specification of the projector, "$INPUT_H$" and "$INPUT_V$" are known based on image data that is input by the projector. The width "$TOTAL_H$" and the height "$TOTAL_V$" of the integrated image screen can be obtained by the following formulae.

$$TOTAL_H = UNIT_H * NUM_H - EB_H * (NUM_H - 1)$$

$$TOTAL_V = UNIT_V * NUM_H - EB_V * (NUM_V - 1)$$

Examples of the enlarging processing and the cutting-out processing executed by each projector 100 will be described. First, the control unit 300 of the projector adds black belts to the upside and downside, or the left and right of an input image so that the aspect ratio of the input image conforms to the aspect ratio of the integrated image screen. Specifically, if $TOTAL_H/TOTAL_V > INPUT_H/INPUT_V$ is met, the control unit 300 adds black belts having a width $BLANK_H$ to the left and right of the input image. "$BLANK_H$" and "enlargement factor m" can be obtained in the following formulae.

$$BLANK_H = (TOTAL_H * INPUT_V/TOTAL_V - INPUT_H)/2$$

$$m = TOTAL_V/INPUT_V$$

Otherwise, the control it 300 adds black belts having a width $BLANK_V$ (not shown) to the upside and downside of the input image. "$BLANK_V$" and "enlargement factor m" can be obtained in the following formulae.

$$BLANK_V = (TOTAL_V * INPUT_H/TOTAL_H - INPUT_V)/2$$

$$m = TOTAL_H/INPUT_H$$

The image obtained by the control unit 300 adding black belts to the input image and enlarging it m-times has the same size as that of the integrated image screen. Each projector obtains cutout coordinates (x, y) of the enlarged image using the following formulae. Examples of (x, y) are indicated with circles in the drawing. "$POS_H$" and "$POS_V$" are positions of the projector that are known based on the received layout setting instruction (FIG. 6D).

$$x = (POS_H - 1) * (UNIT_H - EB_H)$$

$$y = (POS_V - 1) * (UNIT_V - EB_V)$$

Furthermore, the control unit 300 of each projector cuts out, from the enlarged image, an area at upper left coordinates (x, y), the width $UNIT_X$ pixel, and the height $UNIT_Y$ pixel.

In this manner, the control unit 300 controls (in step S205) the image processing unit 305 to perform, for example, the above-described black-belt adding processing, enlarging processing, and cutting-out processing. Also, the control unit 300 may control the image processing unit 305 to perform dimming processing on the edge blending areas. In this dimming processing, projection display performed by a plurality of projectors overlap each other in edge blending areas, and thus each projector reduces the brightness only in these areas so that the total illumination intensity of the overlapping areas is equal to the illumination intensity of the projection display of one projector. Note that, in the present embodiment, other settings may also be configured. For example, a configuration is also possible in which the target brightness or chromatic coordinates are included in the layout setting instruction, and the control unit 300 controls the image processing unit 305 to perform image processing so that the brightness or chromatic coordinates match the target brightness or chromatic coordinates. In this way, generally, the present embodiment is applicable to any processing as long as it is performed by the user on the projectors one by one for multi projection.

In step S206, the control unit 300 controls the image processing unit 305 to generate an image for giving a notification that the multi projection setting is complete, and to project and display the image. Also, a configuration is possible in which the image processing unit 305 is controlled to delete the projected and displayed image after the elapse of a certain period of time. Then, the control unit 300 moves to step S201.

On the other hand, if no touch has been detected in step S202, the control unit 300 determines, in step S207, whether or not a user operation through the operation unit 315 has been detected. If a user operation has been detected, the control unit 300 moves to step S208, and otherwise to step S210.

In step S208, the control unit 300 instructs the image processing unit 305 to superimpose a menu image on the projection image screen. Specifically, the control unit 300 first determines, based on the menu state stored in the RAM 303 at a point in time in step S207 and the user operation detected in step S207, the following menu state and updates the menu state. Then, based on the new menu state, the control unit 300 generate a new menu image, and instructs the image processing unit 305 to superimpose the generated menu image onto the projection image screen. If, for example, a not-shown menu button included in the operation unit 315 is pressed down in a state in which no menu image is displayed in step S207, the control unit 300 generates a predetermined initial state menu. Furthermore, if, for example, a not-shown right button included in the operation unit 315 is pressed down in a state in which a brightness adjustment menu is displayed in step S207, the control unit 300 generates a menu including a new brightness adjustment value in the menu.

In step S209, the control unit 300 calculates processing to be executed based on the menu state stored in the RAM 303 at a point in time in step S207 and the operation of the operation unit 315 detected in step S207. For example, if a not-shown right button of the operation unit 315 is pressed down in a state in which the brightness adjustment menu is shown in step S207, the control unit 300 calculates brightness adjustment changing processing as processing to be executed. Upon completion of the calculation of processing to be executed, the control unit 300 instructs the corresponding constituent component to execute this processing. For example, in a case of the brightness adjustment changing processing, the control unit 300 instructs the image processing unit 305 to execute this processing. Then, the control unit 300 moves to step S201.

If no operation has been detected in step S207, the control unit 300 determines, in step S210, whether or not communication via the communication unit 316 has been received. If a reception of a signal via the communication unit 316 has been detected, the control unit 300 moves to step S211, and otherwise to step S201.

In step S211, the control unit 300 executes processing based on the received content. Specifically, the control unit 300 first calculates processing to be executed based on the received communication content. For example, if a brightness adjustment command has been received via the communication unit 316, the control unit 300 calculates the brightness adjustment changing processing as processing to be executed. Upon completion of the calculation of processing to be executed, the control unit 300 instructs the corresponding circuit to execute this processing. For example, in a case of the brightness adjustment changing processing, the control unit 300 instructs the image processing unit 305 to execute this processing. On the other hand, upon receiving a signal indicating that the setting for all of the projectors configuring the multi projection is complete, the control unit 300 may generate an image for giving a notification that the multi projection setting is complete, and controls the image processing unit 305 to superimpose the generated image onto the projection image screen. Also, a configuration is possible in which the image processing unit 305 is controlled to delete the image after the elapse of a certain period of time. Then, the control unit 300 returns to step S201.

On the other hand, in step S212, the control unit 300 executes termination processing for the constituent components of the projector 100, and performs control such that the constituent components are turned off. Accordingly, the control unit 300 enters the stand-by state again. Then, the control unit 300 ends this series of operations.

The projection system according to the present embodiment has been described. According to the present embodiment, as described above in step S100 for example, the user can easily input the multi-projection layout information such as 3 image screens horizontally and 2 image screens vertically as shown in FIG. 1 for example, using the setup application of the smartphone 106. Furthermore, as described above in step S101, the user can touch the near field wireless communication unit 319 of an appropriate projector 100 with the smartphone 106, in accordance with an instruction displayed on the display panel 204 of the smartphone 106. Furthermore, when touching, the multi-projection settings are transmitted from the smartphone 106 to the projector 100 through the near field wireless communication 320, and thus the projector can be set more intuitively and reliably. That is, the user can more reliably configure settings for each projector 100 to cut out the associated area of input image signals, enlarge the cut-out area, and perform projection display so that it forms part of the integrated image screen 103.

In other words, the user can reliably set display positions respectively associated with a plurality of projectors.

Modifications of the Present Embodiment

In the foregoing example, a configuration is such that the CPU 200 of the smartphone 106 writes multi-projection setting information into the storage area 321 of the near field wireless communication unit 319 of each projector 100 through the near field wireless communication unit 210. However, another method may be applied as long as setting information is transmitted from the smartphone 106 to the projector 100 when the smartphone 106 comes close to each projector 100 within a predetermined range. For example, setting information may also be transmitted, by the near field wireless communication unit 210 and the near field wireless communication unit 319 performing reception and transmission in a peer-to-peer mode of NFC (Near Field Communication).

Furthermore, a configuration is also possible in which, when writing multi-projection setting information into the storage area 321 of the projector 100 via the near field wireless communication unit 210, the CPU 200 overwrites the area of the handover information 702. In this case, the control unit 300 may also write back the handover information 702 after having completed the multi projection setting in step S205, so that the multi-projection setting information 704 is overwritten into the storage area 321. Alternatively, the control unit 300 may also write back the handover information 702 after having received from the smartphone 106 a notification that the multi-projection setting for all of the projectors is complete in step S211, so that the multi-projection setting information 704 is overwritten into the storage area 321.

Figure 6F:
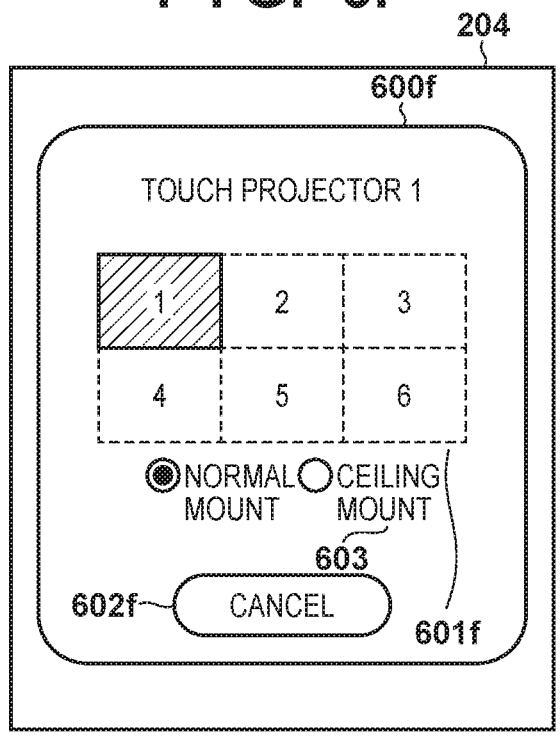

Furthermore, a configuration is also possible in which the CPU 200 can input, into the touch request screen in step S102, setting values of the projector 100 that is required to be touched. Specifically, the CPU 200 may configure a touch request screen (dialog box 6000 as shown in FIG. 6F. For example, the CPU 200 displays, in the dialog box 600f, a layout image 601f that simulates a multi-projection layout and a cancel-mode transition button 602f, as in the dialog box 600b or the like. On the other hand, in contrast to the dialog box 600b or the like, the CPU 200 displays a selection option 603 in the dialog box 600f. The selection option 603 enables a user to select whether the projector 100 to be touched is set in a normal mount installation (in which it is mounted on, for example, a floor or desk with its housing bottom oriented downward) or in a ceiling mount installation (in which it is mounted on, for example, a ceiling with its housing bottom oriented upward). When the user inputs one of the options, the CPU 200 stores the input setup method as one of the individual layout information in the table 800 shown in FIG. 8. Then, at the time of subsequent writing for multi projection in accordance with a touch (step S107), the CPU 200 writes, as one type of information that is written as the multi-projection setting information 704, the value indicating the normal mount installation or the ceiling mount installation into the storage area 321 of the projector 100. On the other hand, when the control unit 300 configures multi projection settings based on the multi-projection setting information 704 in response to the input of the touch (step S205), the control unit 300 instructs the image processing unit 305 not to perform inversion if the value indicating the normal mount installation is written in the multi-projection setting information 704. On the other hand, the control unit 300 instructs the image processing unit 305 to perform vertical and horizontal flip if the value indicating the ceiling mount installation is written in the multi-projection setting information 704. With this measure, the user only needs, when performing touching with the smartphone 106, to operate the smartphone 106 to configure settings of the projectors 100 without operating the projectors 100 one by one, resulting in an improvement in convenience. Furthermore, the present embodiment is not limited to the above-described setting of the type of installation, and another type of setting of the projectors 100 may also be configured, namely, for example, the setting of brightness of the light sources 309 of the projectors 100 may also be configured similarly.

Figure 5C:
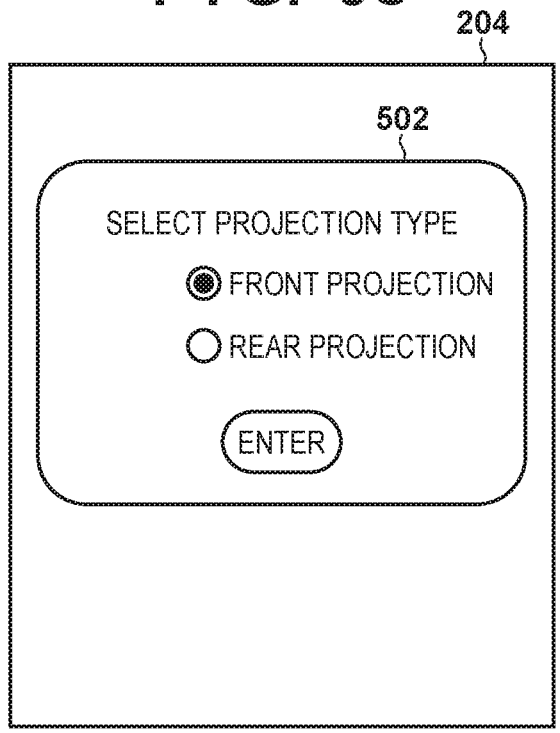

Furthermore, in the above-described examples, in step S100, display for prompting the user to input, as layout information, the horizontal number of image screens and the horizontal number of image screens of multi projection is performed. However, a configuration is also possible in which, after having received inputs of the horizontal number of image screens and the horizontal number of image screens of multi projection, a dialog box 502 shown in FIG. 5C is displayed on the display panel 204. This dialog box 502 prompts the user to select the projection type of the multi projection (that is, the front projection type of projecting an image onto the front face of the screen or the rear projection type of projecting an image onto the rear face of the screen).

Figure 11A:
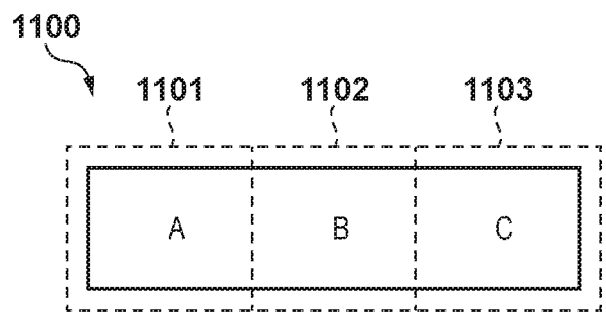
FIGS. 11A to 11C illustrate front projection and rear projection that are executed by the projector according to the first embodiment.

The front projection and the rear projection according to the present modification will be described with reference to FIGS. 11A to 11C. Here, for ease of description, an example of multi projection of 3 image screens horizontally by 1 image screen vertically is taken. An input image 1100 shown in FIG. 11A shows an image to be input to each of the projectors that configure the multi projection. The input image 1100 is an image that includes, for example, "A, B, C". Since the multi projection of this example is configured by three projectors, the input image 1100 is divided into three areas, namely, an area 1101, an area 1102, and an area 1103, and each projector projects the associated divided area.

Figure 11B:
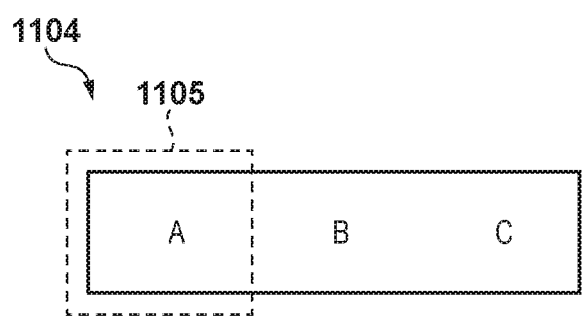

An output image 1104 shows FIG. 11B is a projection image screen in the front projection, when viewed by a user from the front side of the screen. The output image 1104 is an image that includes "A, B, C" as in the input image 1100. Here, an area 1105 at the left end of the output image 1104 corresponds to the area 1101 at the left end of the input image 1100.

Figure 11C:
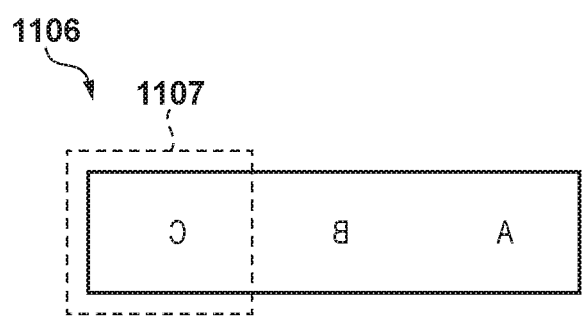

An output image 1106 shown in FIG. 11C is a projection image screen in the rear projection, when viewed by the user from the rear side of the screen. In rear projection, an image needs to be projected in a state of having been subjected to horizontal flip in advance, so as not to appear to be horizontally flipped when viewed from the front face of the screen. Accordingly, in contrast to the input image 1100, the output image 1106 is an image in which "A, B, C" are inverted. Here, an area 1107 at the left end of the output image 1106 corresponds to the area 1103 at the right end of the input image 1100 and includes an inverted image thereof. On the other hand, even in a case of rear projection, when the user views the image from the front side of the screen, the image appears to be the image shown in FIG. 11B. Accordingly, in the case of rear projection, there may be two types of layout display depending from which side the user views the screen.

Figure 6G:
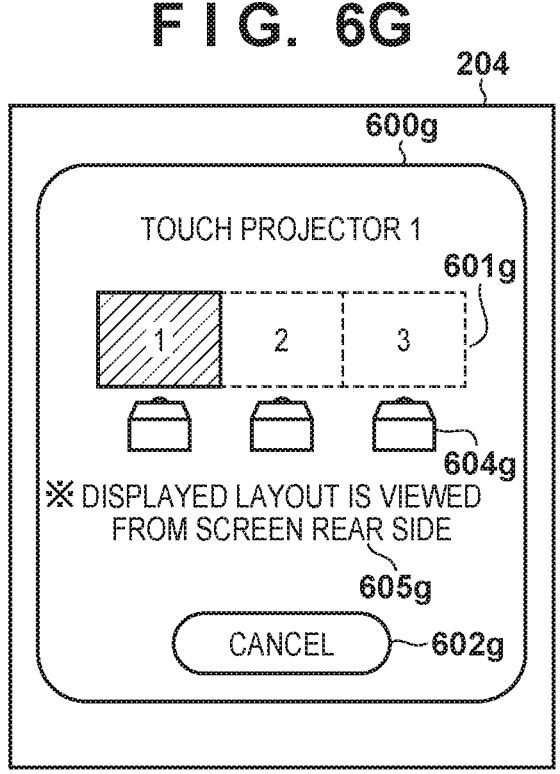

Here, if the rear projection is selected in the dialog box 502, the CPU 200 may modify the dialog box shown in step S102 to one shown in FIG. 6G. A dialog box 600g includes, similar to the configuration such as the dialog box 600b or the like, a layout image (layout image 601g) and a cancel-mode transition button (cancel-mode transition button 602g). The dialog box 600g further includes icons 604g that correspond to areas of the layout image 601g. In the example shown in FIG. 6G, the icons 604g of the projectors are arranged on the near side of the layout image 601g that simulates the multi projection, and the projection type is shown intuitively based on the layout relationship between the projectors and the projection image screens. That is, it is shown that the current projection type is rear projection and the projection is observed from the rear side of the screen. Furthermore, a message 605g "Displayed layout is viewed from screen rear side" may also be provided to express that the projection type is front projection. Note that, here, as described with reference to FIG. 11C, the inverted positional relationship with respect to the input image is shown, and thus in the series of operations described above in FIGS. 4A and 4B, processing just needs to be performed with the left and right projectors exchanged. Specifically, processing just needs to be performed with the rectangle 1 in the layout image 601g replaced with the rectangle 3 in the front projection.

Figure 6H:
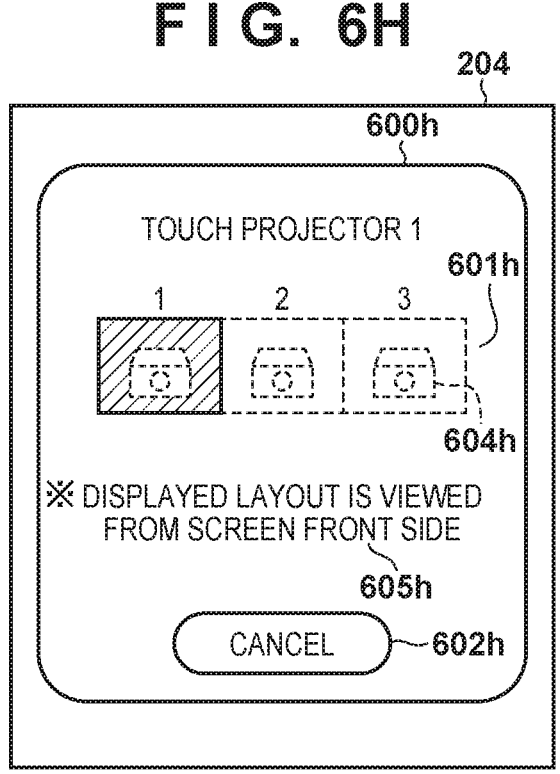

Alternatively, if the rear projection is selected in the dialog box 502, the dialog box displayed in step S102 may also be modified to one shown in FIG. 6H. A dialog box 600h includes, similar to the dialog box 600b or the like, a layout image (layout image 601h) and a cancel-mode transition button (cancel-mode transition button 602h). The dialog box 600h further includes icons 604h that correspond to areas of the layout image 601h. In the example shown in FIG. 6H, the icons 604h are arranged as if the projectors are provided on the far side of the layout image 601h that simulates the multi projection, and the projection type is shown intuitively based on the layout relationship between the projectors and the projection image screens. That is, it is shown that the current projection type is rear projection and the projection is observed from the front side of the screen. Furthermore, a message 605h "Displayed layout is viewed from screen front side" may also be provided to express that the projection type is rear projection.

Furthermore, the following operation may also be performed when the rear projection is selected in the dialog box 502. That is, at the time of writing multi-projection setting information in accordance with a touch on the projector 100 with the smartphone 106 (step S107), the CPU 200 may also add a value indicating the rear projection to the multi-projection setting information 704 to be written. When the control unit 300 of the projector 100 configures multi projection settings based on the multi-projection setting information 704 (step S205), the control unit 300 instructs the image processing unit 305 to perform horizontal flip if the value indicating the rear projection is included in the multi-projection setting information 704. On the other hand, the control unit 300 instructs the image processing unit 305 not to perform horizontal flip if the value indicating the rear projection is not included in the multi-projection setting information 704. With this measure, the present embodiment is also applicable to multi projection that can be subjected to rear projection.

Figure 6I:
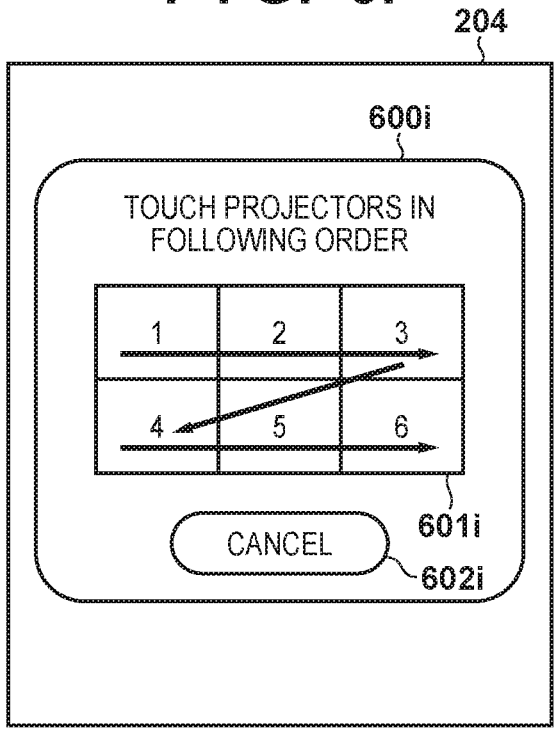
Figure 6J:
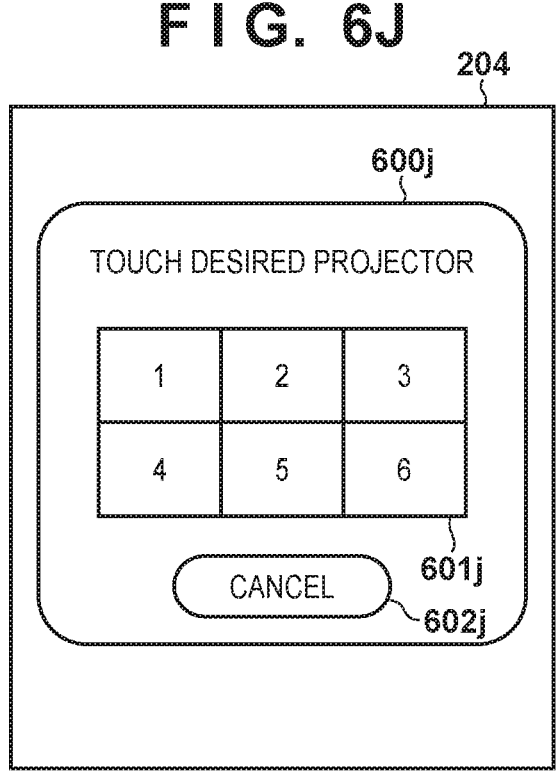

Furthermore, the dialog box displayed by the CPU 200 in step S102 above may also be modified to one shown in FIG. 6I. A dialog box 600i obtained by modifying the dialog box 600a includes a layout image 601i, and a cancel-mode transition button 602i. The layout image 601i shows the order of touching with arrows, instead of highlighting the rectangle that corresponds to the projection image screen of the projector to be touched. Accordingly, the present embodiment can also be realized by indicating the order of touching, instead of indicating the rectangles to be touched one by one for every loop for a projector subjected to the series of operations shown in FIGS. 4A and 4B.

Second Embodiment

Hereinafter, a second embodiment will be described. In the second embodiment, multi-projection setting information is transmitted to a projector through communication different from near field wireless communication, instead of multi-projection setting information being written into the projector 100 through the near field wireless communication 320. The present embodiment is the same as the first embodiment except for this point. Accordingly, the same reference numerals are given to substantially the same configurations and operations, redundant descriptions thereof are omitted, and description will be given while focusing on mainly differences.

Series of Operations of Touch Processing Executed on Smartphone

Figure 12A:
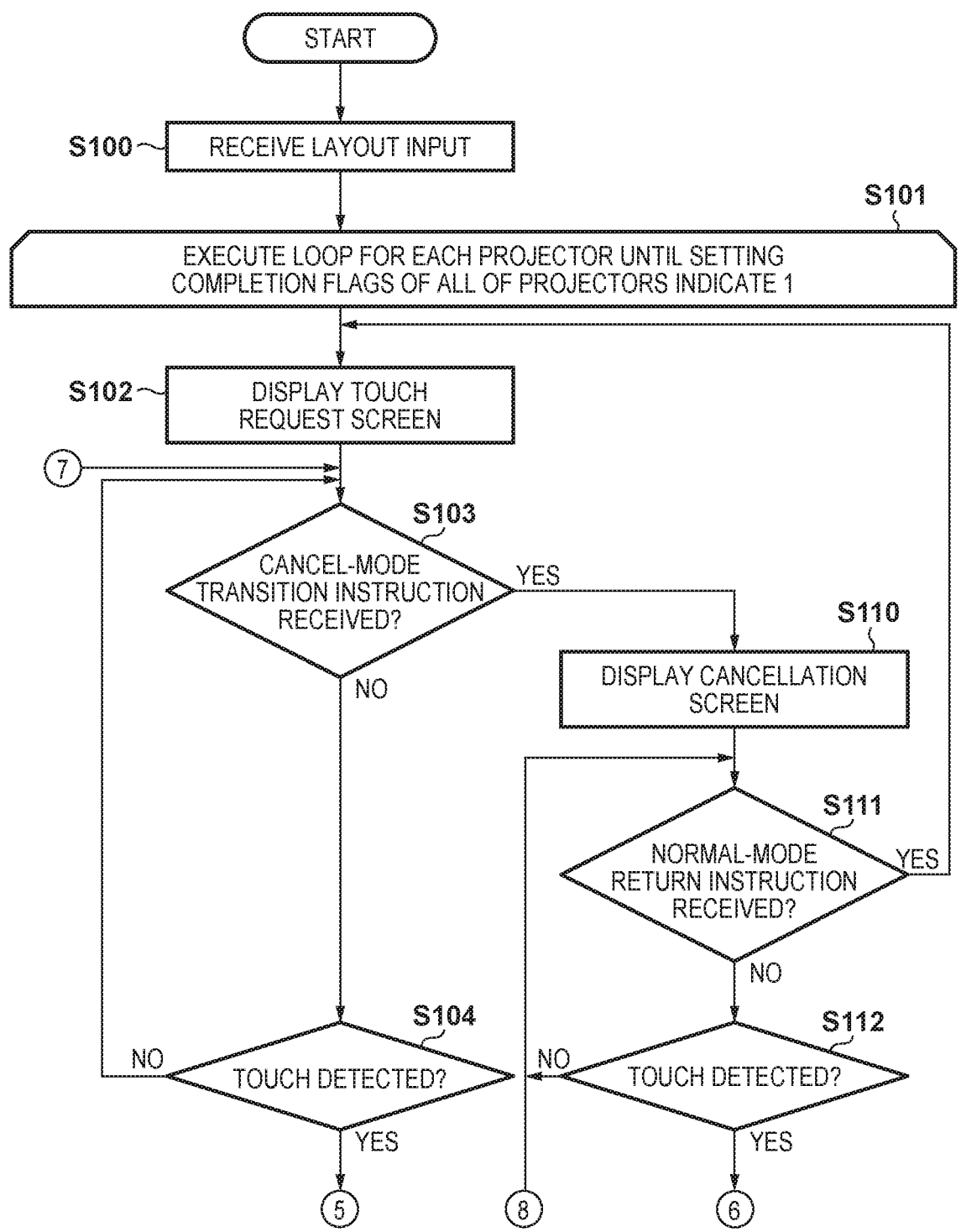
FIGS. 12A and 12B are flowcharts illustrating a series of operations of touch processing that is executed on the smartphone according to a second embodiment.
Figure 12B:
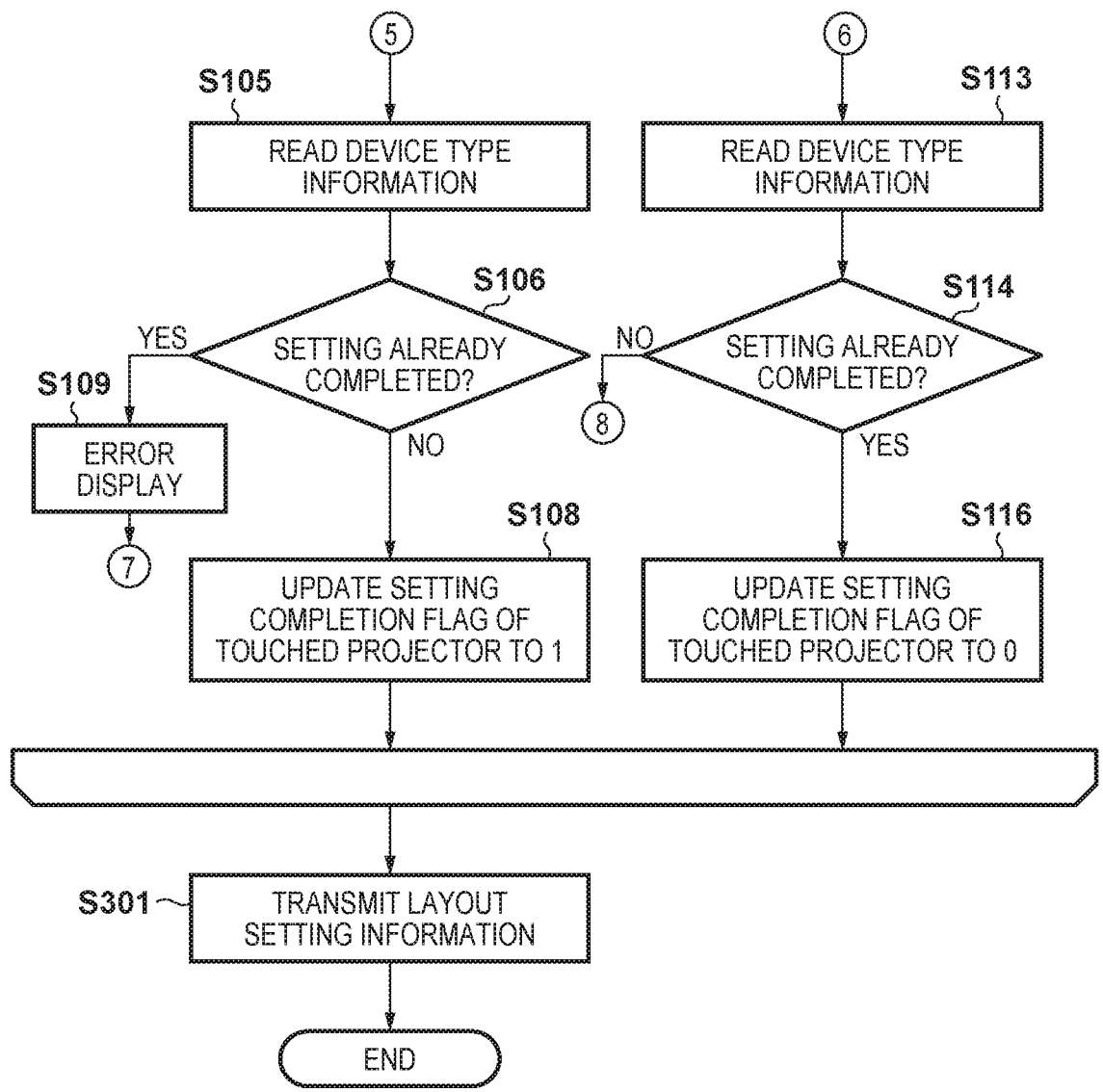

The following will describe a series of operations of touch processing that is executed on the smartphone according to the present embodiment with reference to FIGS. 12A and 12B. Note that, as with the first embodiment, the series of operations according to the present embodiment is started when, after the CPU 200 has started the OS, for example, a user has input a start instruction for a projector setup application through the touch sensor 205 for example. Also, the CPU 200 reads, based on the code of the OS, the code of this application and data required for its execution from the ROM 202 onto the RAM 201, and executes control in accordance with the application code.

As in the first embodiment, the CPU 200 executes steps S100 to S106, and S109. If it is determined, in step S106, that the setting of the projector to be processed is complete, the CPU 200 moves to step S108. Then, the CPU 200 executes step S108, and ends the loop for each projector.

Furthermore, as with the first embodiment, the CPU 200 executes steps S110 to 114. If it is determined, in step S114, that the setting of the projector to be processed is complete, the CPU 200 moves to step S116. Then, the CPU 200 executes step S116, and ends the loop for each projector. Then, if the condition for completion of the loop starting from step S101 is met, the CPU 200 moves to step S301.

In step S301, the CPU 200 uses a communication unit 209 that is different from the near field wireless communication unit 210 to transmit, to the projectors 100 configuring the multi projection, respective types of multi-projection setting information associated with the projectors 100. That is, the CPU 200 reads out the table 800 from the RAM 201, and transmits, to the projectors 100 that correspond to the respective rows of identifiers, the following information via the communication unit 209. The information to be transmitted is the layout information (the horizontal number of image screens and the vertical number of image screens) input in step S100, and the individual layout information (the horizontal position and the vertical position) in each of the rows in the column 802 that were read out from the table 800. For example, when an example shown in FIG. 6A is displayed in step S103, the CPU 200 transmits, as the multi-projection setting information 704, information (3, 2, 1, 1) that indicates the horizontal number of image screens, the vertical number of image screens, the horizontal position, and the vertical position in the stated order. Furthermore, when an example shown in FIG. 6B is displayed in step S103, the CPU 200 transmits, as the multi-projection setting information 704, information (3, 2, 2, 1) that indicates the horizontal number of image screens, the vertical number of image screens, the horizontal position, and the vertical position in the stated order. Note that a configuration is also possible in which, in order to execute such communication, the CPU 200 reads out IP addresses or the like of the projectors 100 from the handover information 702 or the like when executing the near field wireless communication 320 in step S104. Furthermore, additionally, the CPU 200 may also receive another type of information relating to multi projection. Furthermore, as with the first embodiment, the CPU 200 transmits, upon completion of the transmission of the layout setting information, a notification that the setting for all of the projectors is complete, and then ends this series of operations.

Note that the touch request screen displayed in step S102 may perform as follows. In step S102, the CPU 200 displays a touch request screen (dialog box 600j) shown in FIG. 6J on the display panel 204 to request a touch from the user. The dialog box 600j include, similar to the dialog box 600b or the like, a layout image (layout image 601j) and a cancel-mode transition button (cancel-mode transition button 602j). Also, the layout image 601j simulates the multi-projection layout, as with the layout image 601a or the like, but is displayed so that the projector 100 to be touched is not specified.

Figure 6K:
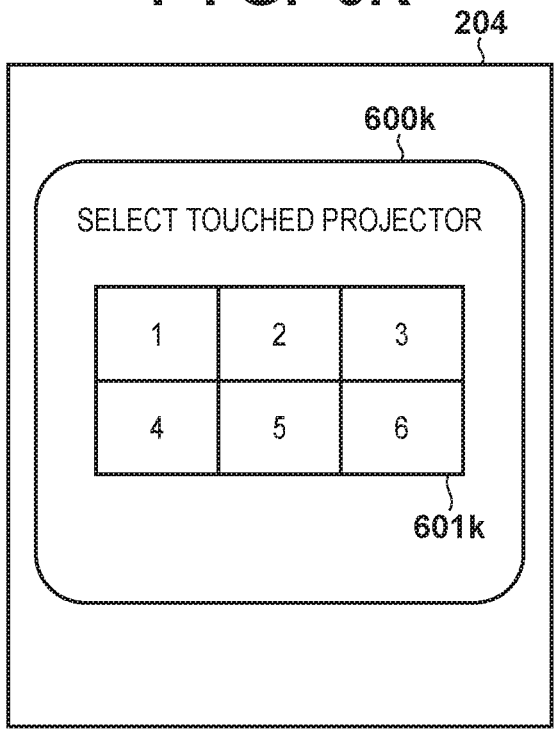

Furthermore, the processing in step S108 may also be performed in the following manner. First, the CPU 200 displays a touch request screen (dialog box 600k) as shown in FIG. 6K on the display panel 204. The dialog box 600k prompts the user to select the image screen in the layout to which the last touch corresponds. The dialog box 600k includes a layout image 601k. The CPU 200 detects any tap on the layout image 601k made by the user, and thereby obtains the horizontal position and the vertical position in the layout of the image screen that corresponds to the touched projector 100. Then, the CPU 200 updates the table 800. Specifically, in the table 800, the setting completion flag in the column 804 of the row that corresponds to the obtained horizontal position and vertical position is updated to 1. Furthermore, additionally, the identifier value included in the device type information 703 read out in previous step S105 is stored in the identifier in the column 803 of that row. That is, the fact that the setting of the projector is complete is recorded in the table 800.

With this measure, when it is desired to define the order of the projectors 100 to be touched with the smartphone 106 based on the convenience for the user, the user can touch the projectors in the intended order.

Series of Operations of Touch Response Processing of Projector

Figure 13:
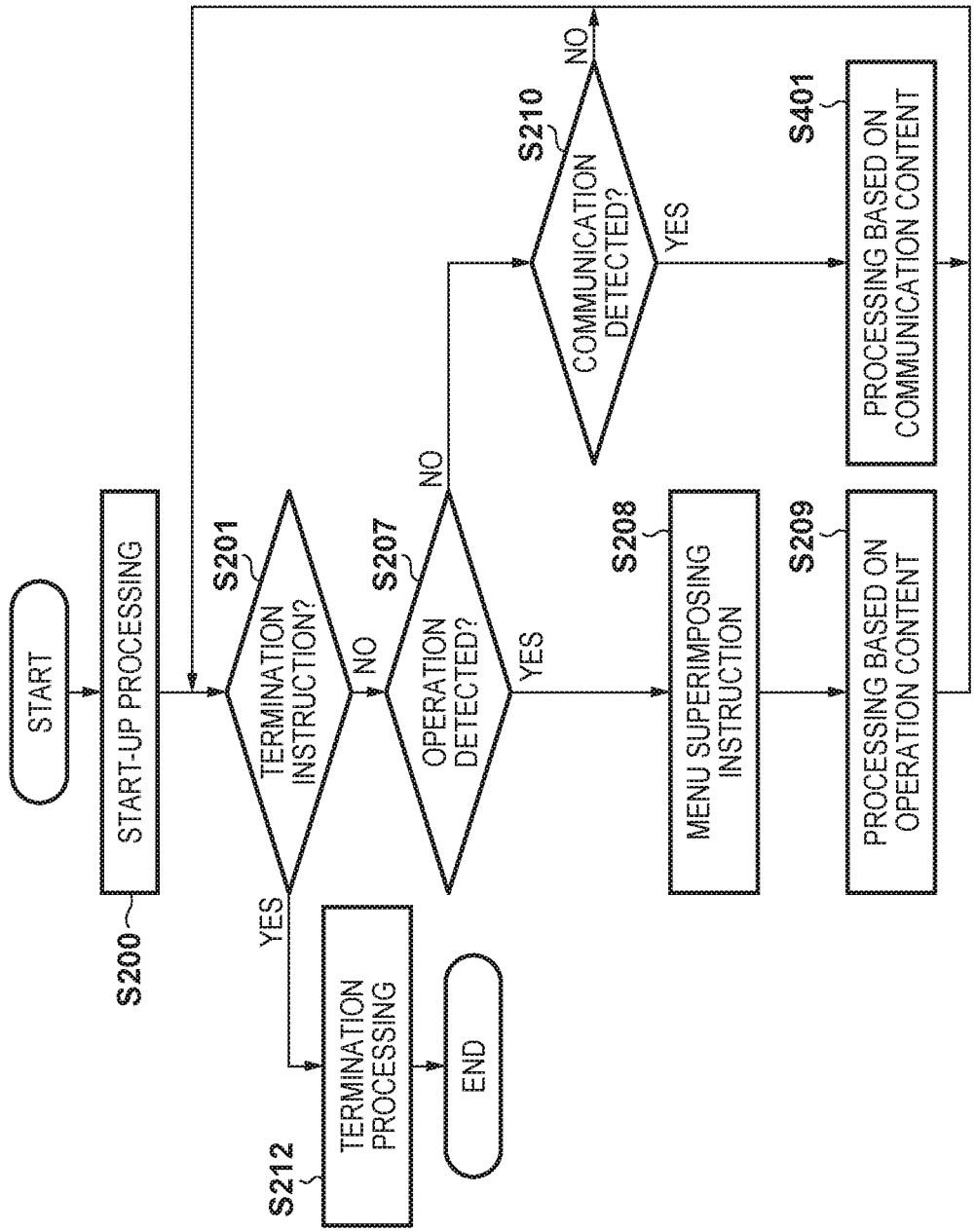
FIG. 13 is a flowchart illustrating a series of operations of the projector according to a second embodiment.

The following will describe a series of operations of touch response processing of a projector according to the present embodiment with reference to FIG. 13. Note that this processing is also started as with the first embodiment, and also is realized by the control unit 300 loading the program stored in the ROM 302 into a work area of the RAM 303, executing the loaded program, and controlling the constituent components such as the panel driving unit 306.

As with the first embodiment, the control unit 300 executes steps S200 to S201, and S212. If it is determined, in step S201, that no termination instruction has been given, the control unit 300 moves to step S207. Furthermore, the control unit 300 executes steps S207 to S210 as in the first embodiment. If it is determined, in step S210, that communication has been detected, the control unit 300 moves to step S401.

In step S401, the control unit 300 determines whether or not content of the communication received in step S210 includes in the above-described multi-projection setting information transmitted from the smartphone 106, and if it is not included, the control unit 300 further performs the processing as in step S211 of the first embodiment. If the multi-projection setting information is included, the following processing will be performed. Specifically, the control unit 300 configures the setting, based on the multi-projection setting information received via the communication unit 316, so that the projection image screen of the projector 100 forms part of the multi projection. There are various types of multi projection settings, and for example, the setting described with reference to step S205 in the first embodiment is applicable. Then, the same processing as in step S206 in the first embodiment may also be performed. Then, the control unit 300 ends this series of processing.

The projection system according to the present embodiment has been described. With the present embodiment, as with the first embodiment, a user can reliably set the assigned position of each of projectors configuring multi projection, with the intuitive operation of touching the projector with the smartphone 106. Accordingly, for example, the communication unit 209 can transmit, using high-speed communication, required information such as layout setting information to the projector.

Other Embodiments

In the above-described embodiments, as an example of the integrated image screen 103, an example has been described in which images projected by the projectors are integrated to appear to be one display image screen, but the present invention is not limited to this configuration. For example, a projection system may be used in which one projector displays one entire picture, and another projector displays a text. Also, in this case, the present invention is applicable in view of making it easy to set in which projection area the image screen of each projector is to be displayed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-224854, filed Nov. 22, 2017, which is hereby incorporated by reference herein in its entirety.

What is claimed is:

1. A communication apparatus that is capable of communicating with one of a plurality of display apparatuses, so that an integrated image screen is constituted by combining display image screens of the plurality of display apparatuses, comprising:
a communication module configured to communicate with an external device that is close to the communication apparatus within a predetermined range through near field wireless communication; and
a display panel configured to display information relating to a first display apparatus of the plurality of display apparatuses,
wherein the display panel displays a dialog box including:
a layout image that indicates the vertical number of the display image screens and the horizontal number of the display image screens constituting the integrated image screen and that indicates a portion corresponding to a display image screen displayed by the first display apparatus and a portion corresponding to a display image screen displayed by another display apparatus in a manner that the portion corresponding to the display image screen displayed by the first display apparatus can be distinguished from the portion corresponding to the display image screen displayed by the other display apparatus; and
a message to prompt a user to make the communication apparatus close to the first display apparatus.

2. The communication apparatus according to claim 1, wherein
the plurality of display apparatuses include projection apparatuses each configured to project the display image screen as a projection image screen.

3. The communication apparatus according to claim 1, further comprising
a transmitting unit configured to transmit layout information, to the first display apparatus indicating the vertical number of display image screens and the horizontal number of display image screens constituting the integrated image screen, and position information indicating vertical position and horizontal position of the display image screen displayed by the first display apparatus with respect to the integrated image screen.

4. The communication apparatus according to claim 3, wherein
the transmitting unit transmits the layout information and the position information through the near field wireless communication.

5. The communication apparatus according to claim 3, wherein
the transmitting unit transmits the layout information and the position information through communication that is different from the near field wireless communication and is established using handover information acquired through the near field wireless communication.

6. The communication apparatus according to claim 5, wherein
the handover information includes an identifier that identifies the external device with which the near field wireless communication has been established.

7. The communication apparatus according to claim 1, wherein
the display panel displays the layout image so that a portion corresponding to a display image screen displayed by any display apparatus of the plurality of display apparatuses for which a setting of the integrated image screen has been set can be distinguished from a portion corresponding to a display image screen displayed by a any display apparatus of the plurality of display apparatuses for which the setting has not been set.

8. The communication apparatus according to claim 1, wherein
the communication apparatus has a normal mode in which a setting of the integrated image screen is set to any display apparatus of the plurality of display apparatuses and a cancel mode in which a setting of the integrated image screen set in any display apparatus of the plurality of display apparatuses is cancelled, and
the display panel displays a button for transitioning to a mode from the normal mode to the cancel mode in a case where a display apparatus for which the setting of the integrated image screen has been set exists.

9. The communication apparatus according to claim 1, wherein
the display panel displays a selection item that enables selection whether any display apparatus of the plurality of display apparatuses is set in a normal mount installation or in a ceiling mount installation.

10. The communication apparatus according to claim 1, wherein the display panel displays an icon indicating a projection manner of display apparatus of the plurality of display apparatuses.

11. The communication apparatus according to claim 10, wherein
the icon indicates that the projection manner of the display apparatus is rear projection.

12. A control method of a communication apparatus that communicates with one of a plurality of display apparatuses, so that an integrated image screen is constituted by combining display image screens of the plurality of display apparatuses, the method comprising:
communicating with an external device that is close to the communication apparatus within a predetermined range through near field wireless communication;
displaying information relating to a first display apparatus of the plurality of display apparatuses,
wherein the displaying information comprises displaying a dialog box including:
a layout image that indicates the vertical number of the display image screens and the horizontal number of the display image screens constituting the integrated image screen and that indicates a portion corresponding to a display image screen displayed by the first display apparatus and a portion corresponding to a display image screen displayed by another display apparatus in a manner that the portion corresponding to the display image screen displayed by the first display apparatus can be distinguished from the portion corresponding to the display image screen displayed by the other display apparatus; and
a message to prompt a user to make the communication apparatus close to the first display apparatus.

13. A non-transitory computer-readable storage medium storing a program for causing a computer to execute a control method of a communication apparatus that communicates with one of a plurality of display apparatuses so that an integrated image screen is constituted by combining display image screens of the plurality of display apparatuses, the method comprising:
communicating with an external device that is close to the communication apparatus within a predetermined range through near field wireless communication;
displaying information relating to a first display apparatus of the plurality of display apparatuses,
wherein the displaying information comprises displaying a dialog box including:
a layout image that indicates the vertical number of the display image screens and the horizontal number of the display image screens constituting the integrated image screen and that indicates a portion corresponding to a display image screen displayed by the first display apparatus and a portion corresponding to a display image screen displayed by another display apparatus in a manner that the portion corresponding to the display image screen displayed by the first display apparatus can be distinguished from the portion corresponding to the display image screen displayed by the other display apparatus; and
a message to prompt a user to make the communication apparatus close to the first display apparatus.

* * * * *